(12) United States Patent
Foster et al.

(10) Patent No.: US 7,848,012 B2
(45) Date of Patent: Dec. 7, 2010

(54) METHOD AND APPARATUS FOR CONTINUOUS WAVE HARMONIC LASER

(75) Inventors: David H Foster, Corvallis, OR (US);
Theodore Alekel, Portland, OR (US);
David A Dutton, Corvallis, OR (US);
Joseph G. LaChapelle, Philomath, OR (US); Michael J. Munroe, Eugene, OR (US)

(73) Assignee: Deep Photonics Corporation, Vancouver, WA (US)

( * ) Notice: Subject to any disclaimer, the term of this patent is extended or adjusted under 35 U.S.C. 154(b) by 0 days.

(21) Appl. No.: 12/171,105

(22) Filed: Jul. 10, 2008

(65) Prior Publication Data

US 2009/0067035 A1 Mar. 12, 2009

Related U.S. Application Data

(60) Provisional application No. 60/948,824, filed on Jul. 10, 2007.

(51) Int. Cl.
*G02F 1/35* (2006.01)
*G02F 2/02* (2006.01)

(52) U.S. Cl. .................. 359/328; 359/326; 372/22; 372/97; 372/105

(58) Field of Classification Search ......... 359/326–332; 372/21, 22, 92, 97–106; 385/122
See application file for complete search history.

(56) References Cited

U.S. PATENT DOCUMENTS

| | | | |
|---|---|---|---|
| 5,633,883 A * | 5/1997 | Shi et al. | 372/20 |
| 2006/0054864 A1* | 3/2006 | Alekel et al. | 252/301.4 R |
| 2007/0211773 A1* | 9/2007 | Gerstenberger et al. | 372/22 |

\* cited by examiner

*Primary Examiner*—Daniel Petkovsek
(74) *Attorney, Agent, or Firm*—Townsend and Townsend and Crew LLP

(57) ABSTRACT

An apparatus for producing coherent, continuous wave, ultraviolet light, includes one or more source lasers in the visible or near-infrared frequency range. The apparatus also includes one or more frequency conversion stages. Each of the one or more frequency conversion stages includes one or more reflectors, an optical resonator, one or more waveguide components, or one or more fiber optic components. At least one of the one or more frequency conversion stages includes a huntite-type aluminum double borate nonlinear optical material to produce light having a wavelength between 190 and 350 nm. The huntite-type aluminum double borate material has a composition given by $MAl_3B_4O_{12}$, where M is one or a plural combination of elements {Sc, La, Y, or Lu}.

12 Claims, 12 Drawing Sheets

METHOD AND APPARATUS FOR CONTINUOUS WAVE HARMONIC LASER

CROSS-REFERENCES TO RELATED APPLICATIONS

The present application claims benefit under 35 U.S.C. §119(e) of U.S. Provisional Patent Application No. 60/948,824, filed on Jul. 10, 2007, entitled "Methods and Apparatus for Continuous Wave Harmonic Lasers," the disclosure of which is hereby incorporated by reference in its entirety for all purposes.

BACKGROUND OF THE INVENTION

The present invention relates generally to certain compounds having optical properties. A specific embodiment of the present invention relates generally to high performance laser sources that use nonlinear optical processes to convert laser light to greater frequencies. More particularly, embodiments of the present invention provide a specific compound comprising $MAl_3B_4O_{12}$ where M is one or a plurality of the elements {Sc, La, Y, or Lu}. In a particular embodiment, a laser apparatus is provided that produces coherent CW UV light with wavelengths that range between 190 and 350 nm and uses a device fabricated from materials described herein that are suitable for generation of electromagnetic radiation having a wavelength of 350 nm and less. However, it will be appreciated that the present invention has a much broader range of applicability.

Continuous wave (CW) ultraviolet (UV) lasers that emit light in the wavelength range 190-350 nm are in increasing demand for many industrial and research applications. Although CW lasers producing greater than 1 W of light in the 190-350 nm wavelength range have been constructed in research laboratories, such lasers have limited operating lifetimes and have not been significantly transformed into commercial products. In order to reach the UV wavelength spectral range, a source laser, emitting coherent radiation at a near-infrared (NIR) or visible wavelength, is converted to lower wavelengths (higher frequencies) by passing through one or more stages of frequency conversion to achieve second harmonic generation (SHG) and/or sum frequency generation (SFG). SHG stages convert a portion of the input light into light at a frequency of twice the input light (a wavelength of half of the input light). SFG stages take input light at two different frequencies and convert some of this input light into light at a frequency that is the sum of the input frequencies.

The SHG and SFG frequency conversion stages are created by using special nonlinear optical (NLO) materials that generate higher frequency light by processes that are now satisfactorily understood and that are categorized under the topic "nonlinear optics." In many cases the NLO device is a single crystal of a nonlinear optical material that has been engineered to operate for a select purpose. In an SHG stage, light at the fundamental frequency (FF) propagates through the NLO device, and some significant fraction of this light is converted to light at the second harmonic (SH). The SH light is generated at different positions along the length of the NLO device, and propagates forward with propagation vector $k_{SH}$. In order for the frequency conversion to be at all efficient, the propagating fundamental light must maintain an aligned in optical phase throughout the length of the NLO device with the SH light that is being locally generated. This requirement is called phase-matching. The phase of the newly-generated SH light is $\pi/2$ plus twice the phase of the FF light that has propagated up to the current position. Thus the phase-matching requirement is really a condition on the propagation constants for the FF and SH light. The condition for perfect phase-matching for a common type of SHG known as Type I SHG is:

$$k_{SH}=2k_{FF}. \qquad (1)$$

For SFG and for a less common type of SHG known as Type II SHG, the perfect phase-matching condition is $$k_3=k_1+k_2, \qquad (2)$$

where the angular frequencies are related by $\omega_3=\omega_1+\omega_2$ and the propagation vectors may be non-collinear. A number of strategies for phase-matching are known in the art, including critical phase-matching, non-critical phase-matching (NCPM), and quasi-phase-matching (QPM).

Under operating conditions, the efficiency at which a NLO device converts light to the target frequency increases when the electric field strength of light at any of the involved wavelengths is increased. For SHG, the local power conversion rate for non-depleted conversion is proportional to the product of the intensity at the fundamental frequency and the square root of the intensity at the second harmonic:

$$dI_{SH}(x)/dz \propto I_{FF}(x)I_{SH}(x)^{1/2}. \qquad (3)$$

Here z is the distance propagated through the NLO device, and x is the position vector (x, y, z). For SFG, the local power conversion rate for unsaturated conversion is proportional to the square root of the product of the intensities at all three frequencies involved:

$$dI_3(x)/dz \propto [I_1(x)I_2(x)I_3(x)]^{1/2}. \qquad (4)$$

The simplest design of an SFG or SHG stage is a single-pass stage, where each of the input beam paths passes once through the NLO device and in a single direction. The output beam path in a single pass stage exits the crystal once and does not reenter it. Available sources of CW light with sufficiently good beam quality for frequency conversion have output powers on the order of watts or tens of watts. The single-pass frequency conversion stage with these laser sources produces overall power conversion efficiencies that are usually unacceptably low, typically well below 1%. In order to increase the efficiency, the intensities on the right side of Equations (3-4) must be increased by means of one or more enhancement cavities. These resonant cavities "build up" the field strength of light at designed frequencies by coherently adding (interfering) light that has traversed the cavity different numbers of times. Many UV laser designs with one or more cavities have been built and many more imagined.

There exists only a select few nonlinear materials that can usefully convert light into the deep UV. The two commercial materials are beta-Barium Borate ($\beta$-$BaB_2O_4$ or BBO) and Cesium Lithium Borate ($CsLiB_6O_{10}$ or CLBO). CLBO is very hygroscopic and requires an environment purged with a dry gas for harmonic laser generation to endure. CLBO is susceptible to fracture during a bake-out procedure that is necessary each time the crystal is exposed to ambient conditions. As a result, warm-up and cool-down procedures are very slow, typically on the order of several hours. Even with the most elaborate environmental control systems, lasers that use CLBO for harmonic conversion have a very limited lifetime.

The conversion efficiency of an NLO crystal for a particular application is dependent on a number of factors that include, but are not limited to: the effective nonlinearity of the crystal (pm/V), birefringence ($\Delta n$, where n is a refractive index), phase-matching conditions (Type I, Type II, non-critical, quasi, or critical), angular acceptance angle (radiancm), temperature acceptance (K-cm), walk-off (radian), temperature dependent change in refractive index (dn/dT), optical transparency range (nm), and the optical damage threshold (W/cm$^2$). Desirable NLO crystals should posses an optimum combination of the aforementioned properties as defined by the specific application.

Borate crystals form a large group of inorganic NLO materials used in various applications, such as laser-based manufacturing, medicine, hardware and instrumentation, communications, and research studies. Beta barium borate (BBO: $\beta$-BaB$_2$O$_4$), lithium triborate (LBO: LiB$_3$O$_5$), and cesium lithium borate (CLBO: CsLiB$_6$O$_{10}$) are examples of borate-based NLO crystals developed in recent years that are being used widely as NLO devices, especially in high power applications. Select properties suitable for generation of laser light from the mid-infrared to the ultraviolet for these crystals are listed in Table 1.

TABLE 1

Commercially Available NLO Materials and Properties

| PROPERTY | BBO | LBO | CLBO |
|---|---|---|---|
| D$_{eff}$(pm/V) | 2.2 | 0.8 | 0.9 |
| Optical Transmission (nm) | 190-3500 | 160-2600 | 180-2750 |
| Angular Acceptance (mrad-cm) | 0.8 | 6.5 | 0.6 |
| Temperature Acceptance (K-cm) | 55 | 7.5 | 2.5 |
| Walk-off Angle (deg.) | 3 | 0.6 | 1.8 |
| Damage Threshold (GW/cm$^2$) | 5 | 10 | 10 |
| Crystal Growth Properties | flux or congruent | flux | congruent |

BBO has a favorable non-linearity (about 2.2 pm/V), transparency between 190 nm and 3500 nm, significant birefringence (necessary for phase matching), and a high damage threshold (5 GW/cm$^2$, 1064 nm, 0.1 ns pulse width). However, its high birefringence creates a relatively small angular acceptance that can limit conversion efficiencies and laser beam quality. The crystal is relatively difficult to grow to large sizes and is somewhat hygroscopic LBO exhibits optical transparency throughout the visible electromagnetic spectrum, extending well into the ultraviolet (absorption edge.congruent. 160 nm), and possesses a high damage threshold (10 GW/cm$^2$, 1064 nm, 0.1 ns pulse width). However, it has insufficient intrinsic birefringence for phase matching to generate deep UV radiation. Furthermore, LBO melts incongruently and must be prepared by flux-assisted crystal growth methods. This limits production efficiency that leads to small crystals and higher production costs.

CLBO appears capable of producing UV light due to a combination of high nonlinearity and sufficient birefringence. The crystal can also be manufactured to relatively large dimensions. However, the crystal usually is exceedingly moisture sensitive and often invariably sorbs water from the air; hence, extreme care usually must be taken to manage environmental moisture to prevent hydration stresses and possible crystal destruction.

In 1981 a crystal called NYAB [(Nd,Y)Al$_3$B$_4$O$_{12}$] was reported in the USSR. A laser self-frequency-doubling effect from 1320 nm to 660 nm was realized in a Nd$_{0.2}$Y$_{0.8}$Al$_3$B$_4$O$_{12}$ crystal, but it was found that intrinsic crystal absorption at the second harmonic limited practical use of laser self-frequency-doubling from 1060 nm to 530 nm.

Years later several institutes in China succeeded in improving the crystal growing process and obtained NYAB crystals of good optical quality and reasonable size. Lu et al. developed a multi-functional crystal (Nd,Y)Al$_3$B$_4$O$_{12}$ with effective laser self-frequency-doubling conversion. The Nd$^{3+}$ doped laser gain crystal was pumped with a dye laser, with laser emission at 1060 nm that was then converted to 530 nm within itself NYAB has since been used as a research crystal that often is useful only in the visible spectrum. Recent work with Yb-doped YAB as a self-doubling laser gain material follows the same path as NYAB with small alterations in operational laser efficiency and wavelengths. Laser light is generated within the crystal and self-doubled into green 520 nm. Again, its operation and the historic method of preparation limit its use to the visible and infrared. Hence, it is highly desirable to improve techniques for this family of compounds that enable optical function down into the ultraviolet.

BBO is somewhat hygroscopic, though less so than CLBO, and water-soluble. BBO also commonly undergoes degradation over time when used to generate UV light in pulsed, single-pass generation and in CW generation in a resonant cavity. Thus, the most significant shortcoming of both BBO and CLBO is their proclivity to degrade over time. In operation, these NLO materials lose frequency conversion efficiency under normal conditions, as illustrated in FIG. 1.

In an effort to circumvent these deleterious effects, many commercial lasers that use BBO periodically or continuously raster the crystal in the laser beam so that yet undamaged regions of the NLO device are accessed. In one particular commercial 266 nm wavelength laser, shifting the crystal every 8 hours and total laser refurbishment every 3000 hours are necessary solely to accommodate its delicate NLO device. With each translation, the optical cavity requires alignment and optimization, and the interruptions greatly drive up the laser cost-of-ownership in manufacturing environments. The lack of long term reliability in UV laser systems using BBO and CLBO crystals emphasizes the need for laser systems that use a more robust material for the generation of UV light. Thus, there is a need in the art for materials and systems for direct frequency conversion with improved performance during extended use.

SUMMARY OF THE INVENTION

The present invention relates generally to certain compounds having optical properties. More particularly, as an example, embodiments of the present invention provide a specific compound comprising MAl$_3$B$_4$O$_{12}$, wherein M is one or more of the elements Sc, La, Y, or Lu. Merely by way of example, the compound is useful for electromagnetic radiation having a wavelength of 350 nm and less, but it would be recognized that the invention has a much broader range of applicability.

According to an embodiment of the present invention, an apparatus for producing coherent, continuous wave, ultraviolet light is provided. The apparatus includes one or more source lasers in the visible or near-infrared frequency range. The apparatus also includes one or more frequency conversion stages. Each of the one or more frequency conversion stages includes one or more reflectors, an optical resonator, one or more waveguide components, or one or more fiber optic components. At least one of the one or more frequency conversion stages includes a huntite-type aluminum double borate nonlinear optical material to produce light having a wavelength between 190 and 350 nm. The huntite-type aluminum double borate material has a composition given by MAl$_3$B$_4$O$_{12}$, where M is one or a plural combination of elements {Sc, La, Y, or Lu}.

According to another embodiment of the present invention, an apparatus for frequency conversion is provided. The apparatus includes a free space, standing wave cavity characterized by a fundamental wavelength and a cavity axis. The standing wave cavity is configured for second harmonic generation at a doubled wavelength being half the fundamental wavelength. The standing wave cavity includes an input coupler and an output coupler. Each of the input coupler and the output coupler are characterized by a predetermined reflectance at the fundamental wavelength. The apparatus also includes a nonlinear optical device disposed in the standing wave cavity. The apparatus further includes a phase retarder positioned in the standing wave cavity between the input coupler and the nonlinear optical device. The phase retarder includes an anti-reflection coated birefringent material that is tilted with respect to the cavity axis.

According to a particular embodiment of the present invention, an apparatus for producing coherent, continuous wave, ultraviolet light is provided. The apparatus includes one or more source lasers in the visible or near-infrared frequency range. The apparatus also includes one or more frequency conversion stages. Each of the one or more frequency conversion stages includes one or more reflectors, an optical resonator, one or more waveguide components, or one or more fiber optic components. At least one of the one or more frequency conversion stages includes a nonlinear optical material to produce light having a wavelength between 190 and 350 nm. Furthermore, a local maximum optical intensity inside or on a surface of the nonlinear optical material is greater than 5 MW/cm$^2$ during operation.

According to another particular embodiment of the present invention, an apparatus for producing coherent, continuous wave, ultraviolet light is provided. The apparatus includes one or more source lasers that emit radiation in the visible or near-infrared frequency range and one or more frequency conversion stages. Each of the one or more frequency conversion stages includes one or more reflectors, an optical resonator, one or more waveguide components, or one or more fiber optic components. At least one of the one or more frequency conversion stages includes a nonlinear optical material to produce light having a wavelength between 190 and 350 nm. The apparatus further includes one or more thermally-conducting crystal mount components. The nonlinear optical material is soldered to the one or more thermally-conducting crystal mounts.

According to an embodiment of the present invention, an apparatus is provided that produces coherent, continuous wave light. The apparatus has one or more source lasers in the visible or near-infrared frequency range. The apparatus also has one or more frequency conversion stages. At least one of the frequency conversion stages uses a huntite-type aluminum double borate material to produce light (including intermediate frequencies) having a wavelength between 190 and 350 nm. In a specific embodiment, an apparatus is provided that contains a nonlinear material in which the operating light intensity exceeds 5 MW/cm$^2$. In another specific embodiment, a novel crystal mount is provided that includes a thermally-molded metallic form for improved thermal contact with a nonlinear optical, frequency-converting device.

According to an alternative embodiment of the present invention, a laser apparatus is provided that produces coherent CW UV light with wavelengths that range between 190 and 350 nm. The apparatus includes one or more source lasers that emit visible to near-infrared light and uses SHG and/or SFG stages to convert a portion of the light from the source laser(s) into the output light at UV wavelengths. The conversion process may or may not involve intermediate light frequencies and multiple frequency conversion stages. The UV laser apparatus design involves any one of many possible choices at the following design levels: 1) frequency scheme, 2) interference scheme, 3) NLO device design, 4) source laser selection/design, 5) optical design, and 6) electrical/mechanical design. At least one of the SHG or SFG processes, which produces 190-350 nm UV light during the operation of the apparatus, occurs in a NLO device provided by an embodiment of the present invention that consists wholly or partially of a huntite-type aluminum double borate material, having a composition given by $M_xAl_3B_4O_{12}$ where M is comprised of one or a plurality of the elements {Sc, La, Y, Lu}, x ranges from 0.9 to 1.1, and the material optically transmits deep ultraviolet radiation. The use of the material, instead of other commercial materials that can produce UV light, may result in increased device longevity, decreased device maintenance costs and/or downtime, increased device optical output power, increased device compactness, reduced device complexity, reduced device cost, increased output beam quality, and/or other benefits. In particular, the use of the said material allows frequency conversion stage designs using optical modes/beams that are more tightly focused and have greater intensity than are allowed by BBO and CLBO.

According to yet another alternative embodiment of the present invention, a harmonic CW laser apparatus is provided. The apparatus includes an NLO device for frequency conversion that generates 190-350 nm light in an enhancement cavity with an internal resonant light intensity of greater than 5 MW/cm$^2$ and operates for greater than 20 hours without significant diminishment of UV light output. In yet another aspect of the invention, a laser apparatus includes a harmonic frequency converter that produces CW UV light in the 190-350 nm wavelength range where the NLO device is mounted in a thermally-molded metallic form for improved thermal contact under operational load.

Numerous benefits are achieved using the present invention over conventional techniques. For example, in an embodiment according to the present invention, laser devices with improved performance as a function of time are provided. In another embodiment, decreased device maintenance costs and/or downtime, increased device optical output power, and improvements in output beam quality are provided. Various additional objects, features and advantages of the present invention can be more fully appreciated with reference to the detailed description and accompanying drawings that follow.

BRIEF DESCRIPTION OF THE DRAWINGS

FIG. 10b is a simplified exploded view of the crystal mount illustrated in FIG. 10a.

DETAILED DESCRIPTION OF SPECIFIC EMBODIMENTS

Figure 1:
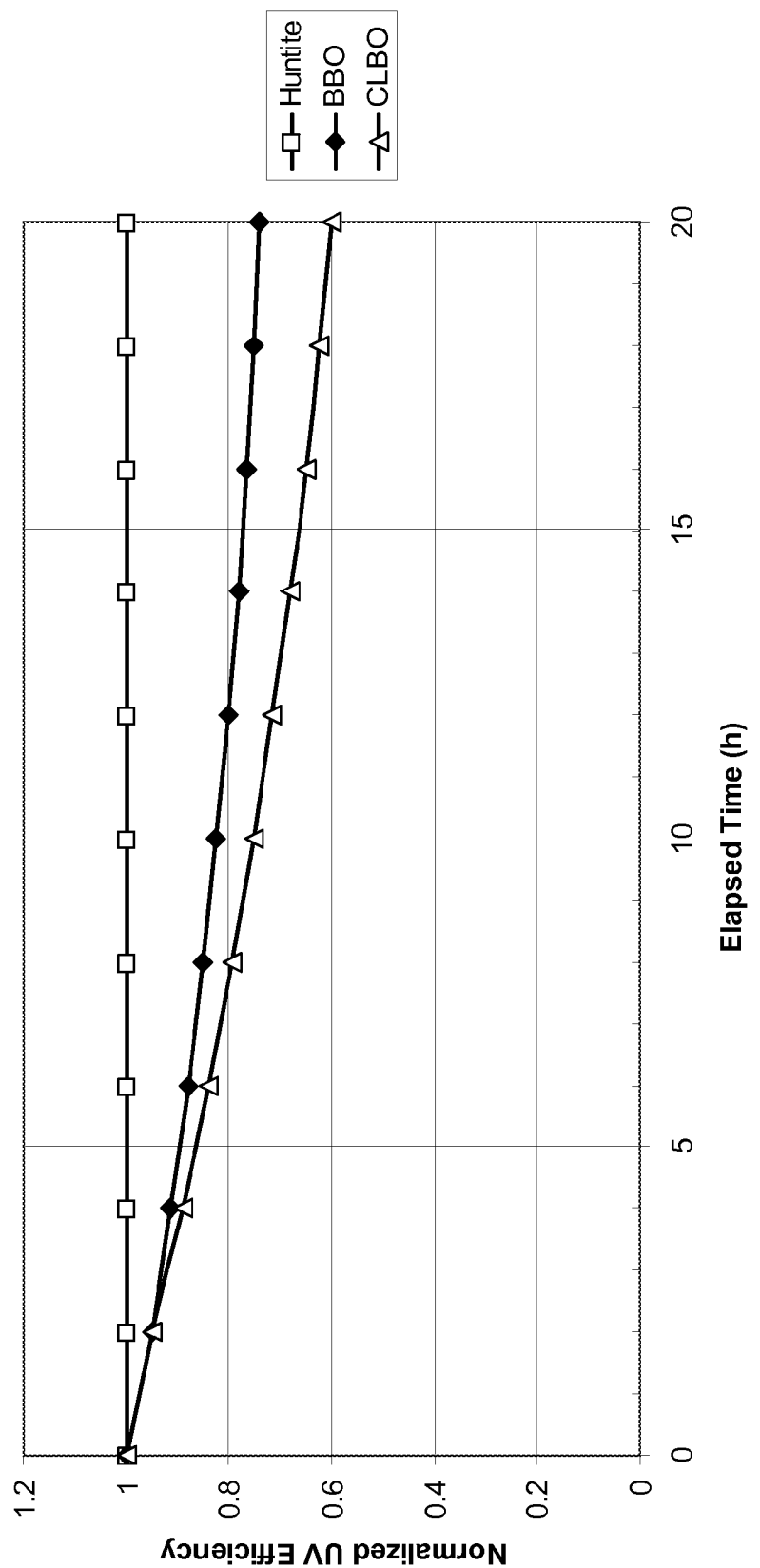
FIG. 1 demonstrates time-dependent behavior for conventional SHG of UV light.

Without limiting embodiments of the present invention, the following glossary is provided in relation to the description herein.

Brewster's angle: The angle of incidence, relative to a given interface between two materials with a given choice of which side of the interface is the incident side, for which light that is polarized having its electric field lying in the plane of incidence is theoretically transmitted through the interface with none of the light being reflected. The special polarization is sometimes referred to as p-polarization or TM polarization.

Cavity: refers to an optical path defined by two or more reflecting surfaces, or by a waveguide or a fiber, along which light can reciprocate or circulate. Objects that intersect the optical path are said to be within the cavity.

Continuous wave (CW) laser: A laser that emits radiation continuously in time rather than in short bursts, as in a pulsed laser.

Deep ultraviolet (DUV): A portion of the electromagnetic spectrum with wavelengths 100-315 nm.

Diode Laser: refers to a light-emitting diode designed to use stimulated emission to generate a coherent light output. Diode lasers are also known as laser diodes or semiconductor lasers.

Diode-Pumped Laser: refers to a laser having a gain medium that is pumped by a diode laser.

Fiber Laser: A laser may be constructed using an optical fiber as the gain medium and are pumped with optical energy. Fibers are typically glass-type materials, though may be crystalline or glass-nano-crystal composites.

Harmonic Generation With relation to radiant energy, the conversion of electromagnetic radiation having a given frequency into radiation having a multiple of the frequency. This can occur when an intense directional light beam passes through a nonlinear optical medium.

Infrared Radiation: refers to electromagnetic radiation characterized by a wavelength between about 700 nm and about 5000 nm.

Laser: refers to an acronym of light amplification by stimulated emission of radiation. A laser is a cavity that contains any material—crystal, glass, liquid, dye or gas—where an atom of which are capable of being excited to a metastable electronic state by a pumping energy e.g., by light or an electric discharge. The light emitted by the atom's electron as it returns to its energetic ground state is able to promote stimulated emission of other atoms in the medium. The light (referred to herein as stimulated radiation) is continually increased in intensity as it makes multiple round trips through the cavity.

Light: refers to electromagnetic radiation in a range of frequencies running from infrared through the ultraviolet, nominally corresponding to a range of wavelengths from about 100 nm to about 15 μm; optical radiation.

Nonlinear effect: refers to a class of optical phenomena that can typically be viewed only with nearly monochromatic, directional beams of light, such as those produced by a laser. Harmonic generation (e.g., second-, third-, and fourth-harmonic generation), optical parametric oscillation, sum-frequency generation, difference-frequency generation, optical parametric amplification, and the stimulated Raman effect are examples.

Nonlinear material: refers to materials that possess a non-zero nonlinear dielectric response to optical radiation that can give rise to nonlinear effects. Examples of nonlinear materials include crystals of lithium niobate ($LiNbO_3$), lithium triborate ($LiB_3O_5$ or LBO), beta-barium borate ($\beta$-$BaB_2O_4$ or BBO), cesium lithium borate ($CsLiB_6O_{10}$ or CLBO), yttrium aluminum borate ($YAl_3B_4O_{12}$) and its isomorphs, as well as quasi-phase-matched materials.

Phase-matching: refers to the technique used in a multi-wave nonlinear optical process to enhance the distance over which the desired transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched.

Pulse width: or pulse length; refers to the time or duration of the pulse emitted by a pulsed laser, in seconds.

Q: refers to the figure of merit of a resonator (cavity), defined as $(2\pi)\cdot$(average energy stored in the resonator)/(energy dissipated per cycle). The higher the reflectivity of the surfaces of an optical resonator and the lower the absorption losses, the higher the Q and the less energy loss from the desired mode.

Quasi-Phase-matched (QPM) Material: when the fundamental and higher harmonic radiation are not phase-matched, but a QPM grating compensates. In a QPM material, the fundamental and higher harmonic can have identical polarizations, often improving efficiency. Examples of quasi-phase-matched materials include periodically-poled lithium tantalate, periodically-poled lithium niobate (PPLN) or periodically-poled potassium titanyl phosphate (PPKTP).

Source laser: A laser that is used as a light source of one or more frequency conversion stages. The source laser(s) may be commercial products themselves, or may be constructed as an integral part of the UV laser apparatus, perhaps integrated so that the source lasers do not appear as separate physical units. (If a commercial source laser unit contains one or more frequency conversion stages that are external to the cavity in which lasing occurs, then the term "source laser", as used in this document, refers to the portion of the commercial source laser in which lasing occurs. In this case the external frequency conversion portion of the commercial source is included as part of the frequency conversion portion of the UV laser apparatus as a whole.)

Waist: 1) The narrowest point of a nominally Gaussian beam; 2) the Gaussian beam radius at the narrowest point. The Gaussian beam radius is the radius at which the intensity of a nominally Gaussian beam is $1/e^2$ of the central, peak intensity.

According to certain embodiments of the present invention, several kinds of borate crystals containing one or more kinds of metal ions of a rare earth metal and the like were prepared, and an occurrence experiment of double harmonic (wavelength: 266 nm) was carried out by irradiating frequency-doubled Nd:YAG laser (wavelength: 532 nm) onto these borate crystals. Thereby, the ability to experimentally make NLO materials was demonstrated that produce harmonic light below 350 nm. As a result, strong generation of second harmonic 266 nm from borate crystals was found that includes both Y and Al, and a novel NLO crystal in the form of yttrium aluminum borate was achieved capable of transmitting and producing ultraviolet radiation below 350 nm.

It is an object of certain embodiments of the present invention to produce and utilize nonlinear optical materials that satisfy $Y_{(1-x)}M_xAl_3B_4O_{12}$, where M=Sc, La, or Lu, and $0 \leq x \leq 0.4$, and manufactured by a method that eliminates or significantly reduces contaminants that prohibit device use in the UV spectrum. More specifically, some embodiments of the present invention substantially exclude metals, such as those of Group 6, from being present in the device so as to be useful in the UV below 350 nm.

Huntite-type aluminum double borate materials, referred sometimes herein as the preferred materials, are employed as a NLO device (or as part of a compound NLO device) in the current invention to provide a reliable, high-performance CW UV laser. Recent experimental longevity tests on select preferred materials demonstrate substantially no damage or degradation during SHG, for which the input 532 nm beam had a time-averaged intensity of over 1 MW/cm². No decrease in performance was seen in SHG endurance tests lasting hundreds of hours in which the incident 532 nm beam had a time-averaged intensity ~450 kW/cm². As evidenced by these and other tests, the preferred material offers significantly greater resistance to optical, chemical and mechanical damage/degradation than either BBO or CLBO. Because of this durability, CW UV lasers are able to operate at powers and lifetimes higher and longer than those that are presently available.

There are myriad possible designs for the CW UV laser as described in the summary of the invention. The major levels of design applicable to a CW UV laser apparatus are described with an effort to reveal the extent of the "design space," within each design level, that is covered by the union of the potential implementations of the current invention that are reasonable to someone skilled in the art.

Figure 2:
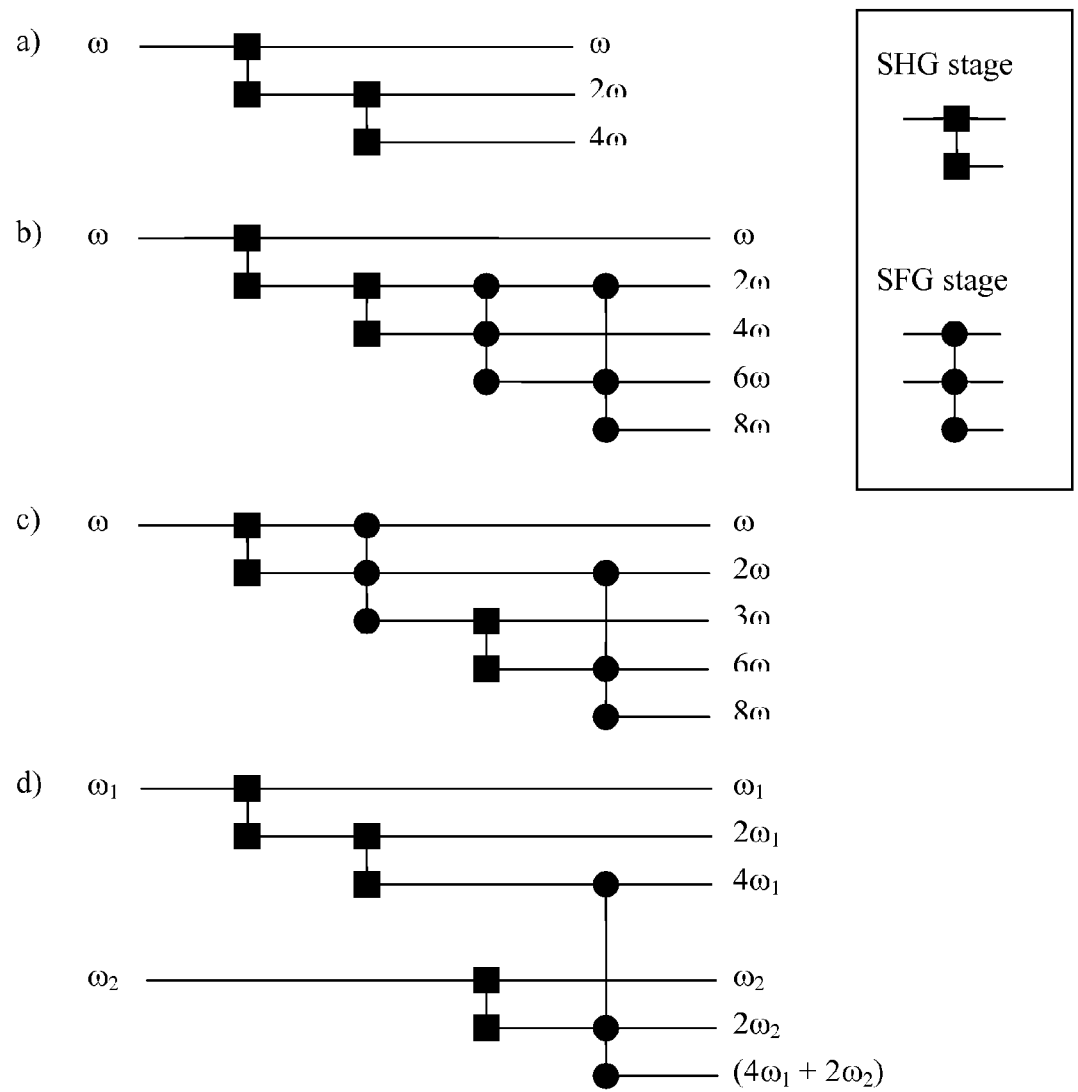
FIG. 2 represents access to a variety of frequency schemes according to an embodiment of the present invention.

The most basic level of design referred herein as the frequency scheme. The frequency scheme can be depicted by a flow chart, such as those shown in FIG. 2, which shows how different frequencies are doubled and/or summed to produce a beam at the target frequency. The diagram begins with one or more source lasers, but the most commonplace usage is one source laser. As such, all of the frequencies produced in the laser are integer multiples of the fundamental frequency.

FIG. 2a shows a simple two stage design to produce light at the fourth harmonic (4ω). Both stages are SHG. FIG. 2b shows a four stage design (SHG, SHG, SFG, SFG from left to right) to produce 8ω light, and FIG. 2c illustrates another scheme. A simpler design would be to use three SHG stages; however, in practice, generating light at 8 times the frequency of common NIR sources using SHG step(s) is often disallowed by phase-matching considerations. Eighth harmonic light can also be made by summing 1ω and 7ω or 3ω and 5ω, and FIG. 2d shows a four stage design with two source lasers. Many more frequency schemes have been devised and can be devised by one skilled in the art.

The frequency scheme design level applies to pulsed lasers as well as to continuous wave. We note that frequency-converted CW lasers are much more difficult to build than frequency-converted pulsed lasers because each frequency conversion stage in the CW laser requires cavity-enhanced light to achieve reasonable conversion efficiency. In contrast, pulsed lasers have high peak power that can efficiently drive NLO frequency conversion and thereby avoid the need for cavity enhancement. Because of the practical difficulty of making multiple resonant cavities, CW lasers are most often assembled with only one or two frequency conversion stages. Though it is possible to build such a laser with three or more frequency conversion stages, their practical limitations prohibit their use in industrial settings. Depending on the output power desired, it is also possible, as described herein, to have fewer resonant cavities than frequency conversion stages.

Embodiments of the present invention include lasers with single frequency sources that produce light at 2ω, 3ω, 4ω, 5ω, 6ω, 7ω, and/or 8ω, as long as the preferred material is used to produce UV light. Other embodiments also include lasers with multiple sources having one or more frequency conversion stages that generate UV light within a device manufactured from the preferred material. The next level of design includes the logical design of the resonant cavities.

The second level of design can be referred to as the interference scheme. The interference scheme contains all the information of the wavelength scheme and further specifies the logical design of the laser. The interference scheme specifies which beams interfere (overlap coherently within a NLO device) to enhance frequency conversion. It also shows which beams pass through a NLO device one or more times but do not participate in standard interference. The interference scheme specifies the logical location of the cavity mirrors in relation to the NLO devices. The interference scheme shows, at each NLO device, which beams or modes are being resonated through the NLO device: doubly passed through the NLO device (retracing itself once through the NLO device after reflection) or singly passed through the NLO device. Bidirectional (standing wave) resonators are usually distinguished from unidirectional resonators (ring cavities), but the shape of each cavity and the exact number of reflectors (if implemented with free space optics) is not specified at this level. The most commonly used interference schemes implement each frequency conversion stage by placing a resonant cavity around the NLO device.

Interference schemes are designed with the recognition that correctly overlapping coherent light beams (or cavity modes) within a NLO device enhances the desired frequency conversion. Equations (3-4) show how the local conversion rate in a NLO device depends on the local intensities of the light involved. To enhance SHG, it is most effective to resonate the FF light, although it is also helpful to resonate the SH light. Resonating light at either or both frequencies with the correct phase relation improves the SHG efficiency. Similarly, resonating any combination of the three frequencies involved in SFG improves efficiency. One way to show the interference scheme is with schematics such as those shown in FIGS. 3 and 4.

In many designs, the frequency conversion stages are strung together in a serial fashion, so that each frequency conversion stage has its own interference scheme independent of the others. FIGS. 3a-3f show a number of interference schemes for a single SHG stage. FIG. 4a shows an example of an interference design for a single SFG stage. FIG. 4b shows an example of a design with two SHG processes, which, instead of being arranged in two well-defined frequency conversion stages that are serially linked, share a single interference scheme.

FIG. 3a shows a common interference scheme of a ring cavity that resonates at the fundamental frequency. The dashed lines indicate the logical position of the reflectors. The fundamental beam goes into the cavity through a surface that is partially reflective (PR) at the fundamental (angular) frequency ω. In implementation, the PR surface could be waveguide junction or fiber junction, in which case the fundamental light tunnels into the cavity region. The fundamental then travels through the NLO device and generates SH light, denoted by two closely spaced arrows. The SH light leaves the cavity through a surface that is highly reflective (HR) for frequency ω and typically anti-reflection coated (AR) for frequency 2ω. The FF light is reflected and routed back to the cavity input location where it is partially reflected and adds coherently with the FF light that is transmitted through the (logical) PR surface. Coherent addition is denoted by the symbol ⊗. The resonant build-up of the FF light can enhance the intracavity FF power many times over its input power, and thus enhances the SHG process according to equation (3). It can be inferred from the figure that the cavity mode is unidirectional; a bidirectional mode would be depicted generating backward traveling SHG light on its way back through the NLO device.

FIG. 3b shows a bidirectional cavity in which the backward traveling FF light, which goes back through the NLO device, generates backward traveling SH light that then transmits out of the cavity and gets routed by reflectors up to a beam splitter where it is recombined with the forward traveling SH light. This type of resonator uses the length of the NLO device twice to generate SH light, which is collected and combined as efficiently as possible. The beam splitter may be polarizing or non-polarizing.

FIG. 3c shows a bidirectional cavity similar to the one above in FIG. 3b. In this case, the backward traveling SH light is reflected forward through the same part of the NLO device where it was generated. In other words, the backward traveling SH light is double passed while the FF light is resonated. The presence of this SH light, if it is phased correctly, enhances the SHG process that generated it according to equation (1). This nonlinear coherent "addition" is denoted by the addition symbol ⊗ next to the square that denotes SHG. In principle this interference scheme allows higher conversion efficiency than the one shown in FIG. 3b because of the influence of $I_{SH}$, as noted on the right hand side of equation (3); however, practical considerations such as beam overlap may make it less desirable.

FIG. 3d shows an example scheme in which neither the FF nor the SH light is resonated (there are no closed loops, so no cavity is formed). In this case the forward traveling FF and the backward traveling SH are both double passed. The enhancement of this design would be typically less than the resonant designs.

FIG. 3e shows a scheme in which the SH light is resonated in a ring cavity, and the FF light transmits into and out of the ring cavity without significant resonance effects. The input and output reflectors may have an AR coating at frequency ω. Resonating the SH light is generally not as beneficial as resonating the FF light, as equation (3) expresses.

Figure 3:
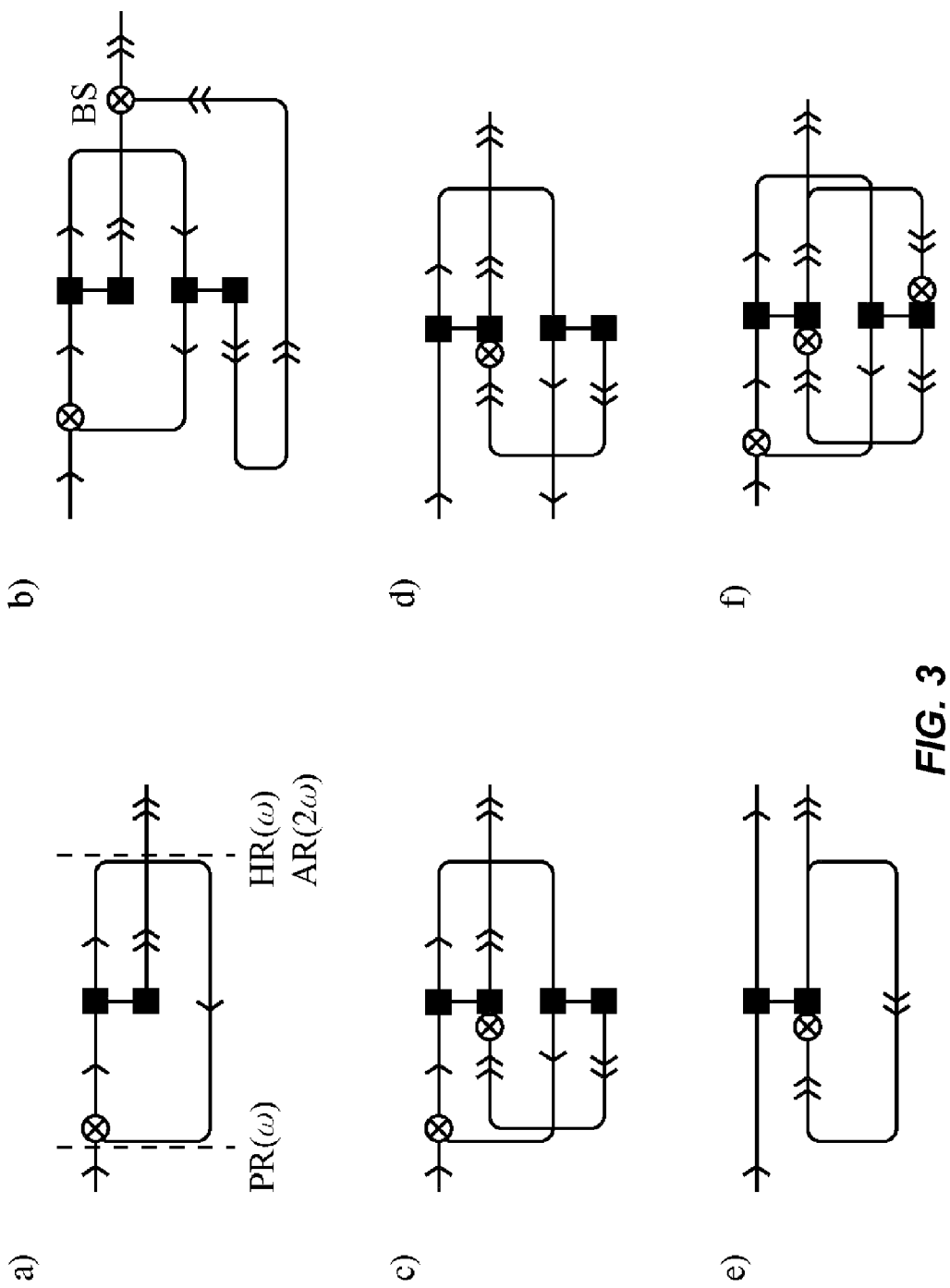
FIG. 3 represents a variety of interference schemes according to an embodiment of the present invention.
Figure 4A:
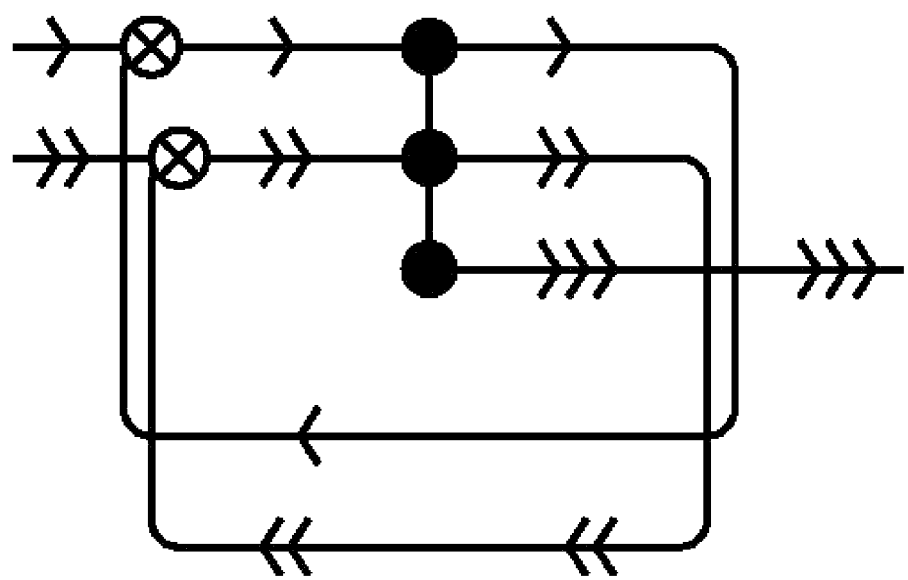
FIG. 4 represents examples of an interference design for a single SFG stage and for two SHG processes in a single interference design according to an embodiment of the present invention.
Figure 4B:
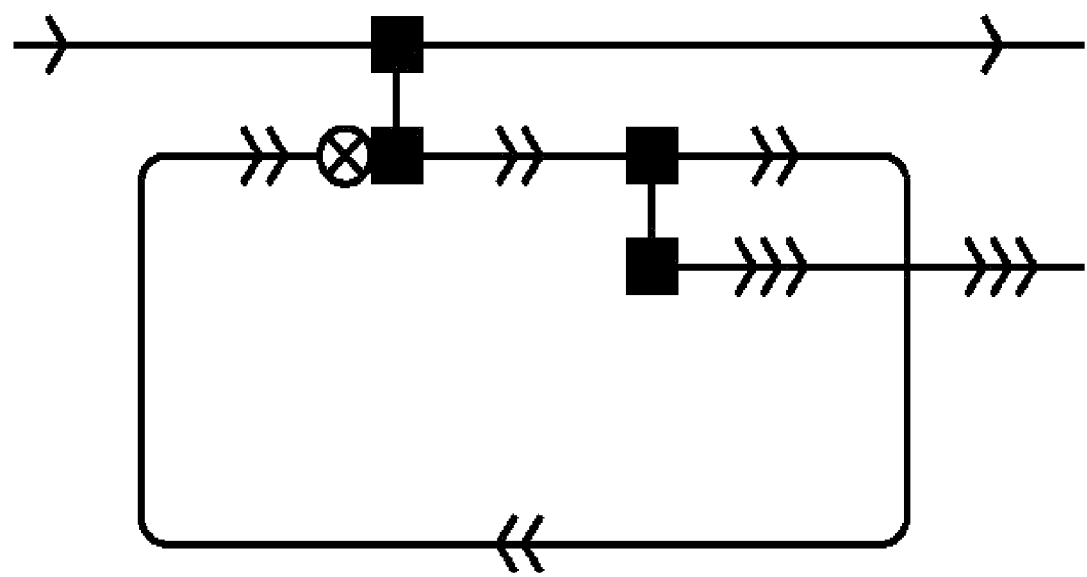

FIG. 3f shows a bidirectional cavity in which both the FF and the SH are resonated. This is commonly called a doubly-resonant cavity and has been implemented a number of times as a monolithic cavity where the faces of the NLO device itself are coated to become the reflective surfaces of the cavity. The interference schemes shown in FIG. 3 are a small fraction of the readily-constructed schemes for a single frequency doubling stage. In practice, mechanical and optical considerations factor strongly into the decision of which interference scheme one selects.

FIG. 4a shows one possible interference scheme for a single SFG stage. The input frequencies are denoted by single and double arrows, but the second input frequency is not necessarily twice the first. The generated sum frequency is denoted by triple arrows. In this particular scheme, the light at each of the input frequencies is resonated, and the cavity modes are unidirectional. The cavity modes at the two input frequencies may lie in the same physical cavity, or they may have regions where they do not overlap. In the second case, the two input modes may not be collinear. An extremely specific SFG stage in which the input modes are non-collinear even within the NLO is described.

FIG. 4b shows one of many schemes in which two frequency conversion stages not linked together in a serial fashion. Here, the FF light is singly passed while the SH light is resonated unidirectionally in a cavity containing two NLO devices (or possibly one compound nonlinear optic that handles two frequency conversion steps). The fourth harmonic light, denoted by the triple arrows, escapes the cavity. In some conventional designs, a similar scheme is used, but the fundamental is resonated in a separate cavity that uses at least some reflectors that are not used in the SH cavity.

The example frequency schemes shown here are provided to give an idea of the design space of frequency schemes that are available to one skilled in the art. Implementations of the current invention include all interference schemes that can be implemented by one skilled in the art, and are not limited to these examples.

The third level of design for the frequency converted laser is the NLO device design. At this level, each nonlinear optic and its desired input configuration is specified. The NLO device material(s), size, orientation, face angles, and coatings are specified. The NLO device may consist of multiple pieces of material that are optically contacted. The desired polarization and transverse field profiles of the input light are specified for each NLO device, along with (a) Type I or Type II conversion methods, (b) critically, non-critically, or quasi-phase-matching methods, (c) input/output faces normal to the incident light, (d) Brewster's angle or any other non-normal angle input and/or output faces, and/or (e) the input/output faces with optical coatings. Schemes are specified that involve optically contacting pieces of nonlinear materials with other pieces of the same material or with other materials, such as the scheme for partial correction of birefringent walk-off, or the common practice of performing two sequential frequency conversions in one compound NLO device. The NLO device may form a monolithic optical cavity, either unidirectional or bidirectional, with a large variety of NLO device designs previously described. Numerical modeling of nonlinear optics is often used as a prerequisite to the NLO device design process.

Embodiments of the present invention include the use of any and all techniques of NLO device design known in the art being applied to the materials described herein. Additionally, the use of these techniques being applied to other nonlinear materials may be used in some embodiments to implement the frequency conversion processes, if any, which do not involve the materials described herein. The high durability and relatively large angular acceptance of the materials provided by embodiments of the present invention allow a NLO device made of this material to endure significantly higher power and/or more tightly focused FF modes/beams than are used in BBO or CLBO crystals. The ability to accept tightly focused, high-intensity beams generally allows NLO devices to be shorter, linear cavities to be smaller, and birefringent walk-off to be less significant. Additionally, the ability to support very high laser intensities results in greater conversion efficiency than is typically achievable with less robust materials. This in turn allows cavity resonators to be designed with lower Q-factors, leading to better cavity lock control and greater tolerance of external vibration.

According to an embodiment, a material is provided that allows access to design parameter space heretofore unattainable for commercial laser systems: tightly-focused beam waists of very high intensity within the NLO material for high conversion efficiency; shorter crystals to reduce walk-off distortion, improve spectral, thermal, and angular acceptance for phase-matching, and reduce absorptive losses; environmental and mechanical robustness that relaxes the conventional need to delicately manage the crystal and its surroundings, and the like. All these attributes may contribute to the unique design of a high performance, low maintenance laser.

This same laser architecture can be employed for other NLO materials with similar attributes of high optical damage threshold and insensitivity to moisture, e.g. $K_2Al_2B_2O_7$. Thus, one element of embodiments is a laser apparatus design with at least one frequency conversion stage that contains a nonlinear material to be used in this novel high-intensity region.

In addition, the resistance of materials described herein to degradation by the presence of water and by thermal cycling allows a novel type of thermal contacting of the NLO device, which in turn allows better thermal control of the crystal. In an example of the novel apparatus, the crystal is mounted by melting a metal form around its exterior and holding it in a thermally-conductive support, and then a process to remove fluxing (wetting) agents is performed by washing with water or a solvent. Longitudinal temperature gradients caused by absorption of focused light modes/beams locally impair the quality of phase-matching; therefore, frequency conversion efficiency is improved with effective heat-sinking of the crystal to reduce temperature gradients.

Figure 10A:
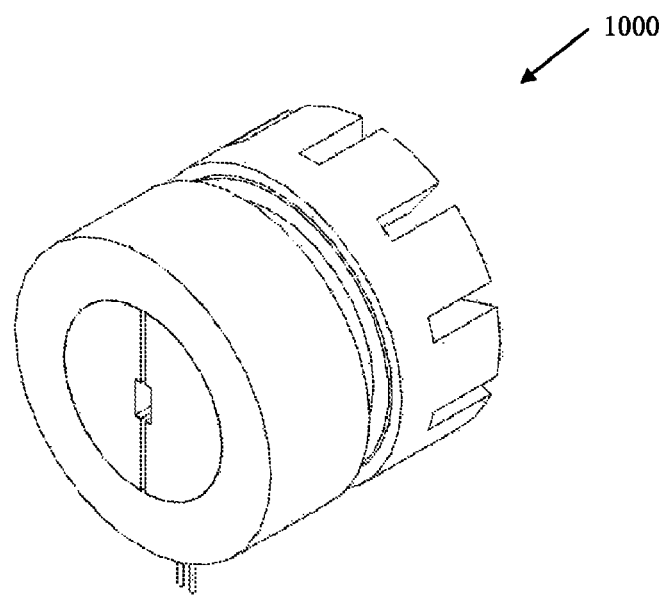
FIG. 10a is a simplified schematic diagram illustrating a crystal mount according to an embodiment of the present invention.
Figure 10B:
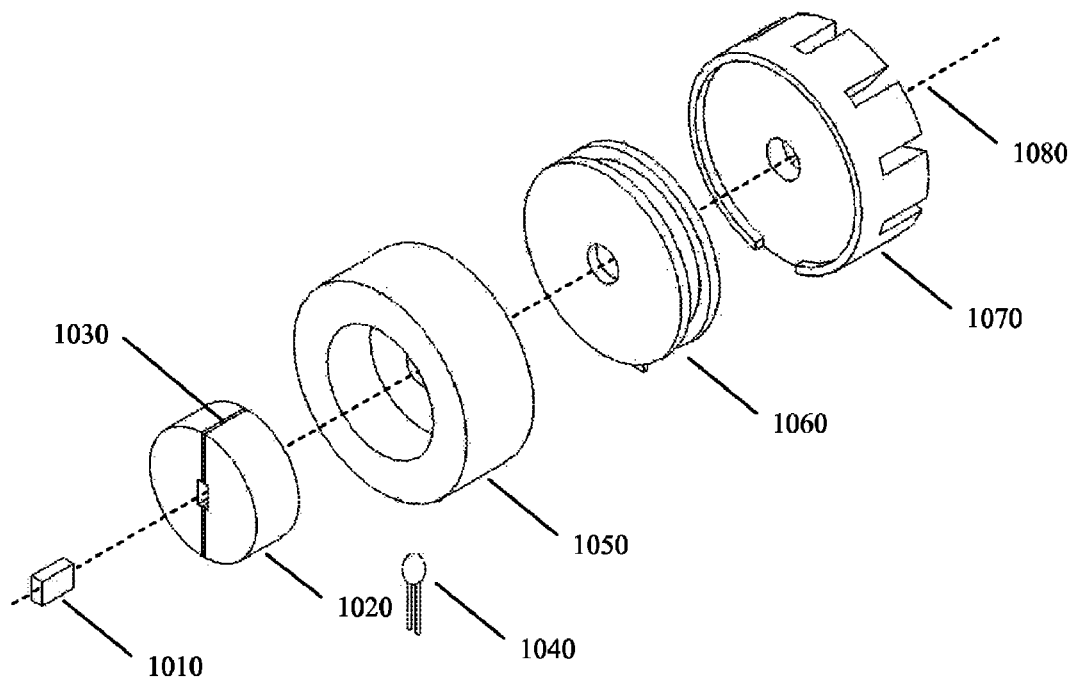

FIG. 10a is a simplified schematic diagram illustrating a crystal mount according to an embodiment of the present invention. FIG. 10b is a simplified exploded view of the crystal mount illustrated in FIG. 10a. As illustrated in FIGS. 10a and 10b, the NLO device is mounted in a thermally-molded metallic form for enhanced thermal contact and conduction under operational load, as viewed as assembly 1000 in FIG. 10a. Combined with the NLO devices made from the preferred materials, this mount is used as components 11 and 17 in the previous embodiments.

Figure 11:
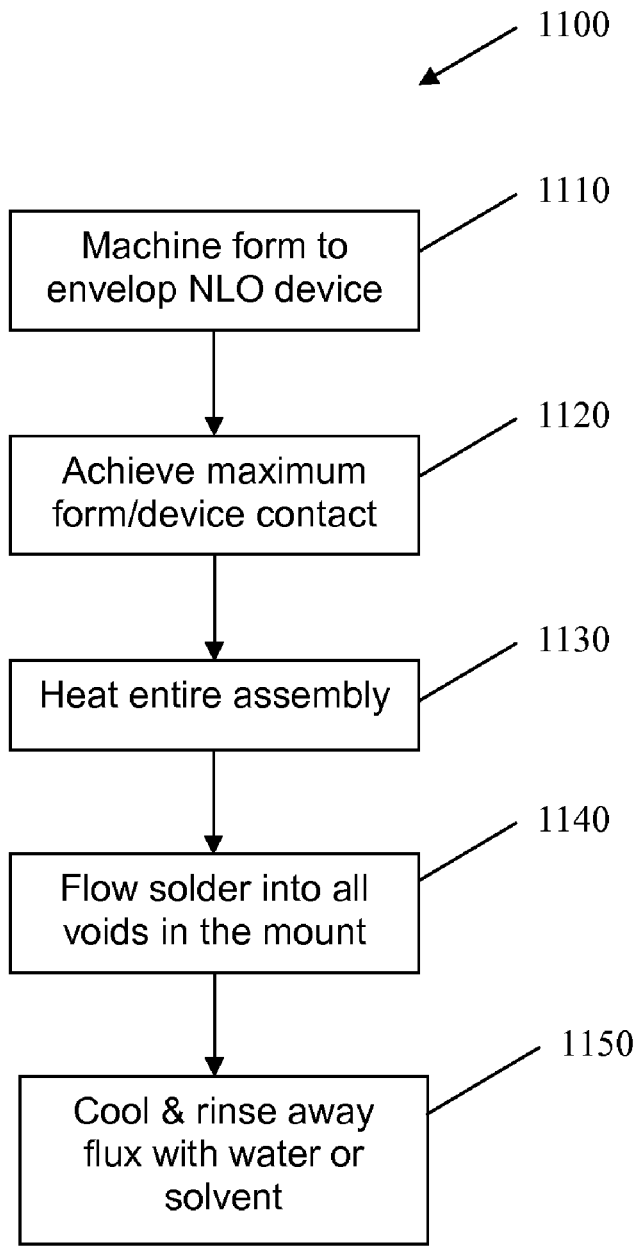
FIG. 11 is a simplified flowchart illustrating a method of mounting a nonlinear optical crystal in the crystal mount illustrated in FIG. 10 according to an embodiment of the present invention.

FIG. 11 is a simplified flowchart illustrating a method of mounting a nonlinear optical crystal in the crystal mount illustrated in FIG. 10 according to an embodiment of the present invention. The first step of the novel NLO device mounting procedure 1100 of FIG. 11 is to fabricate one or more thermally-conductive forms 1020 so that they may partially surround the NLO device 1010 as in procedure 1110. In step 1020, a minimal air gap over the contact area is typically achieved for maximal NLO device surface area contact without impeding the axis of optical propagation 1080. The NLO device 1010 and its surrounding blocks 1020 are fitted into its thermal holder 1050. Together as a unit, they are heated from room temperature to about 525 K in about 1 hour, as procedure 1130. The third step involves the application of a metal solder 1030, having a selected melting temperature of about 525 K and fluxing agents that are soluble in water or a solvent, to the contact areas of the unit {1010, 1020, 1050} sufficient to cause the flow of the solder as procedure 1140. Finally at 1150, the unit is allowed to cool to room temperature and subsequently rinsed with water or a solvent to remove the remaining fluxing agents. A thermal detector 1040 such as a thermistor is mounted in the wall of receiver 1050 to serve as a signal source of temperature for thermal control of the unit. The unit {1010, 1020, 1030, 1040, 1050} is affixed to a thermoelectric device 1060 for thermal control. Heat pump 1060 requires a thermal sink 1070 to accept and distribute thermal energy. The combination of heat pump 1060 and feedback signal 1040 serves as precision control of temperature for NLO device 1010. The device can also be configured and operated so as to reduce longitudinal thermal gradients in NLO device 1010.

It should be appreciated that the specific steps illustrated in FIG. 1 provide a particular method of mounting an nonlinear optical element according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

The first step of a novel mounting procedure utilized in an embodiment is to machine one or more thermally-conductive forms so that they may partially surround the NLO device with minimal air gap over the contact area, which is usually chosen to be as much of the NLO device surface area as possible without impeding the axis of optical propagation. The second step involves applying a metal solder with a melting temperature below 900 K to the contact areas and to heat the mount to a temperature sufficient to cause the flow of the solder. Next, the NLO device is placed into the assembly and heated together as a unit with additional solder so as to fill gaps between the crystal and its mount. Finally, the assembly is rinsed with water or a solvent to remove the remaining fluxing agents.

The fourth level of design specifies the selection of and/or the design of the source laser(s). While source number and source wavelength(s) are specified in the wavelength design, requirements such as minimum laser power, minimum beam quality, and maximum linewidth emerge from modeling at the level of NLO device design and optical design. The need for cavity resonators in CW frequency-converted lasers places an upper bound on source linewidth, and requires a sufficiently uncomplicated beam profile. Desirable source lasers for embodiments of the present invention are high power, polarized output, CW, single-transverse-mode lasers that may include fiber lasers, diode pumped solid state (DPSS) lasers, or gas lasers. Unpolarized or multi-transverse-mode lasers may be used as sources although a considerable portion of the input power is discarded. Embodiments of the present invention include all selections, combinations, and designs of source lasers that are reasonable to and readily chosen by one skilled in the art.

The fifth level of design specifies physical selection of optical components in addition to the NLO devices. At this level, one chooses where free space optics will be used and where waveguide and fiber optics will be used. Mirrors, beam splitters, waveplates, lenses, fiber and fiber components, and waveguide design are all chosen, as well as coatings on optics. The optical design is the selection and spatial arrangement of optical components that implement the interference scheme and the NLO device design. The optical design includes schematic level description of any optical-mechanical cavity locking mechanisms and any frequency locking mechanisms, if they are necessary.

The sixth level of design, the electrical/mechanical design, specifies all the physical components of the apparatus that are not specified in the NLO device and optical designs. The body/casing of the apparatus, optics mounts, electronics, the electromechanical portion of locking mechanisms, temperature control, environmental control such as sealed chambers and purge systems, and control algorithms are all grouped at this design level. The electrical/mechanical design level is the most peripheral design level with regards to the current invention. However, constraints at this physical level typically dictate or at least influence choices at all other levels of design.

Implementations of embodiments of the present invention include the use of any and all prior art at the level of optical design and electrical/mechanical design.

A particular embodiment of the current invention will possess a particular choice at each level of design: the wavelength scheme, the interference scheme, the NLO device design, the source selection/design, the optical design, and the electrical/mechanical design. In an embodiment of the present invention, one of the NLO devices used to produce light at a UV wavelength will include a particular material within the class of huntite-type materials that is described herein. The use of the materials described herein, rather than other commercially-available materials used to produce light in this wavelength range, provides increased device longevity, decreased device maintenance costs and/or downtime, increased device optical output power, increased device compactness, reduced device complexity, reduced device cost, increased output beam quality, and/or other benefits. In another aspect of the present invention, one of the NLO devices used to produce light at new harmonic frequency will have an operating optical intensity exceeding 5 MW/cm$^2$ and an associated light output from 190 to 350 nm. In another element of the present invention, one of the NLO devices used to produce a laser harmonic is mounted in a thermally-molded metallic form for improved thermal contact.

It is an object of some embodiments of the present invention to provide methods for making nonlinear optical materials that satisfy the above composition without the deleterious UV absorption. One embodiment comprises forming a mixture comprising from about 10 to about 30 mol % of a source of Y, from about 10 to about 40 mol % of M, from about 15 to about 40 mol % of a source of Al, and from about 25 to about 50 mol % of boron oxide. If M is Sc, then the source of M generally is scandium oxide; if M is La, then the source of M generally is lanthanum oxide; if M is Lu, then the source of M generally is lutetium oxide. The mixture is heated to a temperature and for a period of time sufficient to form the NLO material. For instance, the step of heating may comprise heating the mixture to a first temperature of at least 850 K, and generally greater than about 850 K. The mixture is then cooled. After cooling the mixture is comminuted (ground to a fine powder, such as by grinding with a mortar and pestle), and then heated to a second temperature of at least 1300 K, generally greater than about 1300 K.

Figure 8:
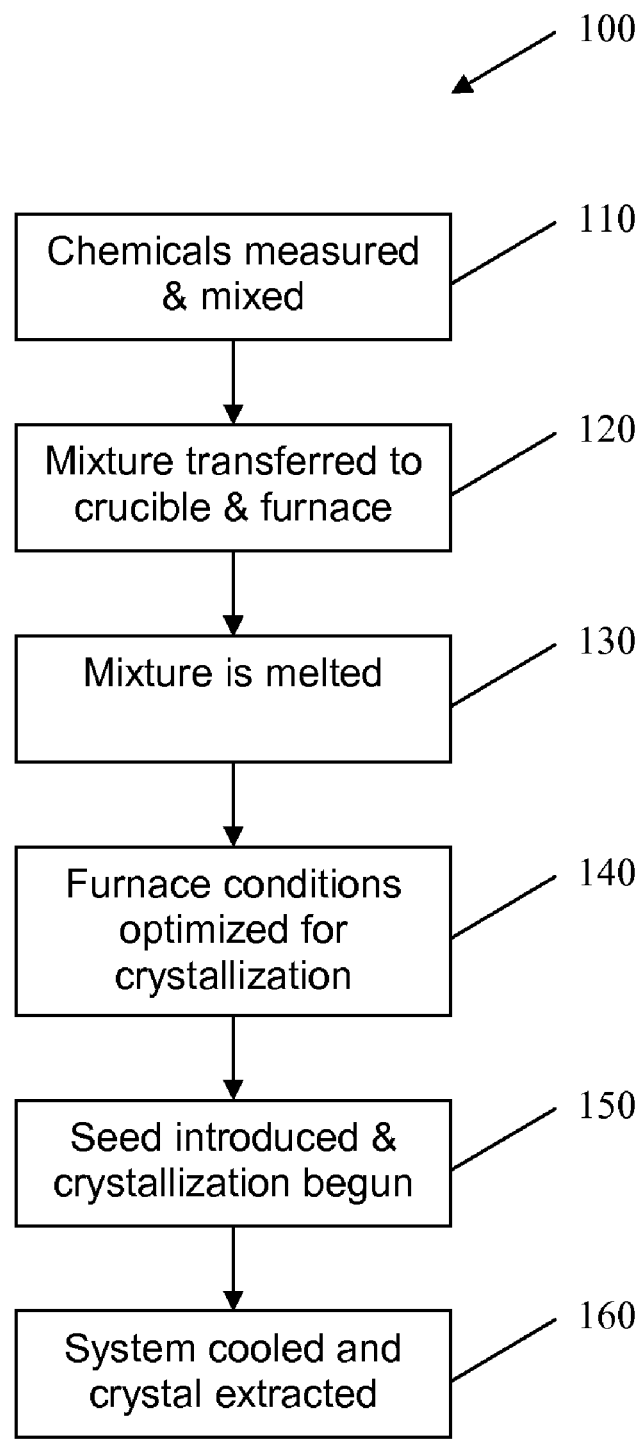
FIG. 8 is a simplified method for making optical compound according to an embodiment of the present invention.

Another method to form these crystalline materials may utilize, but not be limited to top-seeded solution growth as shown in FIG. 8. The method includes the following processes:

1. High purity oxide powders and chemicals are measured and mixed in appropriate proportions.
2. The mixture is loaded in a crucible and placed in a furnace.
3. The mixture is heated and caused to melt into a liquid.
4. After a time, melt temperature is brought near to its freezing point.
5. A cold finger material or a seed crystal is introduced to initiate crystallization.
6. Melt temperature and apparatus conditions are modified and monitored to encourage crystal growth.
7. When appropriate, the system is brought down to room temperature.
8. The crystal is removed from the system.

It should be appreciated that the specific steps illustrated above provide a particular method of growing a nonlinear optical crystal according to an embodiment of the present invention. Other sequences of steps may also be performed according to alternative embodiments. For example, alternative embodiments of the present invention may perform the steps outlined above in a different order. Moreover, the individual steps illustrated above may include multiple sub-steps that may be performed in various sequences as appropriate to the individual step. Furthermore, additional steps may be added or removed depending on the particular applications. One of ordinary skill in the art would recognize many variations, modifications, and alternatives.

For example, the synthesis of $(Y,La)Al_3B_4O_{12}$ may be performed as follows. Yttrium oxide ($Y_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% were purchased from commercial vendors such as Aesar and Stanford Materials. A mixture was formed including about 14 wt % yttrium oxide, about 30 wt % lanthanum oxide, about 19 wt % aluminum oxide, and about 37 wt % boron oxide.

As discussed herein, certain embodiments of the present invention are related to nonlinear optical (NLO) devices and electrooptic devices and the ability to employ such devices below 350 nm. Some embodiments of the present invention are related to nonlinear optical materials that satisfy the general formula $Y_{(1-x)}M_xAl_3B_4O_{12}$ (M=Sc, La, or Lu and $0 \leq x \leq 0.4$ mol %) and are prepared without contaminants that prevent use in the ultraviolet (UV) section of the electromagnetic spectrum.

According to some embodiments of the present invention, the nonlinear optical material $Y_{(1-x)}M_xAl_3B_4O_{12}$ (M=Sc, La, or Lu, and $0 \leq x \leq 0.4$) is used for an NLO device for operation below 350 nm. In another example, the nonlinear optical material is used with a laser source for a device that generates optical radiation below 350 nm. In yet another example, the nonlinear optical material is used with a light source for a device that generates optical radiation below 350 nm. In yet another example, the nonlinear optical material is formed in the trigonal crystal class for use below 350 nm. In yet another example, the nonlinear optical material is formed in the space group R32 for use below 350 nm.

In certain embodiments of the present invention, the nonlinear optical material satisfies $Yb_{(1-x)}M_xAl_3B_4O_{12}$ (M=Sc, La, or Lu, and $0 \leq x \leq 0.4$) or $Lu_{(1-x)}M_xAl_3B_4O_{12}$ (M=Sc, La, or Lu, and $0 \leq x \leq 0.4$). In some embodiments, the nonlinear optical material $Y_{(1-x)}M_xAl_3B_4O_{12}$, $Yb_{(1-x)}M_xAl_3B_4O_{12}$, or $Lu_{(1-x)}M_xAl_3B_4O_{12}$ is doped by Ce and/or Nd. In certain embodiments, the nonlinear optical material $Y_{(1-x)}M_xAl_3B_4O_{12}$ or $Lu_{(1-x)}M_xAl_3B_4O_{12}$ is doped by Ce, Nd, and/or Yb.

In other certain embodiments of the present invention, the nonlinear optical material satisfies $La_{(1-x)}M_xAl_3B_4O_{12}$ (M=Sc, Y, or Lu, and $0 \leq x \leq 0.4$) or $Lu_{(1-x)}M_xAl_3B_4O_{12}$ (M=Sc, La, or Lu, and $0 \leq x \leq 0.4$).

As discussed herein, while NYAB may be available in limited quantities, the pure form of YAB has not been commercially produced. The conventional method of production yields small crystal that contains a large amount of nonstoichiometric metals contamination and exhibits substandard crystal quality. Moreover, the solvent used introduces a considerable amount of contaminant that prevents device operation in the UV below 350 nm. The summary of work on huntite borates by Leonyuk & Leonyuk described a flux system that has subsequently remained as a method of producing YAB and its family members, namely the potassium molybdates $K_2Mo_3O_4$ and $K_2Mo_3O_{10}$. Unfortunately, these solvent formulations possess severe limitations for large scale crystal growth: a) high flux volatility, b) small crystal yield, and c) significant inclusion of Mo atoms into the target borate huntite structure. Thus, neither has commercial crystal production of pure YAB come about nor has the NLO crystal been adopted into laser products.

It is an object of certain embodiments of the present invention to produce and utilize nonlinear optical materials that satisfy $A_xM_{(1-x)}Al_3B_4O_{12}$ where $0 \leq x \leq 0.4$, A=(Sc, Y, La, Lu), M=(Sc, Y, La, Lu), and manufactured by a method that eliminates or significantly reduces contaminants that prohibit device use in the UV spectrum. More specifically, some embodiments of the present invention substantially exclude metals, such as those of Group 6, from being present in the device so as to be useful in the UV below 350 nm. Avoiding the inclusion of Group 6 impurities, such as Mo, extends the UV transmission of select borate huntites. In addition, the absence of superfluous metals in the primary crystal composition reduces the overall bulk spectral absorption over its entire transparency range, such as from 165 to 2700 nm. With the embodiments described herein, the intrinsic transparency may be realized, heretofore unknown and uncharacterized in the scientific community.

As discussed herein, it is an object of some embodiments of the present invention to provide methods for making nonlinear optical materials that satisfy $A_xM_{(1-x)}Al_3B_4O_{12}$ where $0 \leq x \leq 0.4$, A=(Sc, Y, La, Lu), M=(Sc, Y, La, Lu) without the deleterious UV absorption. One embodiment comprises forming a mixture comprising from about 10 to about 30 mol % of a source of A, from about 10 to about 40 mol % of M, from about 15 to about 40 mol % of a source of Al, and from about 25 to about 50 mol % of boron oxide. If A or M is Sc, then the source of A or M generally is scandium oxide; if A or M is Y, then the source of A or M generally is yttrium oxide; if A or M is La, then the source of A or M generally is lanthanum oxide; if A or M is Lu, then the source of A or M generally is lutetium oxide. The mixture is heated to a temperature and for a period of time sufficient to form the NLO material. For instance, the step of heating may comprise heating the mixture to a first temperature of at least 850 K, and generally greater than about 850 K. The mixture is then cooled. After cooling the mixture is comminuted (ground to a fine powder, such as by grinding with a mortar and pestle), and then heated to a second temperature of at least 1300 K, generally greater than about 1300 K.

As discussed herein, FIG. 8 is a simplified method for making optical compound according to an embodiment of the present invention. This diagram is merely an example, which should not unduly limit the scope of the claims. One of ordinary skill in the art would recognize many variations, alternatives, and modifications. The method 100 includes a process 110 for measuring and mixing chemicals, a process 120 for transferring mixture to crucible and furnace, a process 130 for melting mixture, a process 140 optimizing furnace conditions for crystallization, a process 150 for introducing seed and starting crystallization, and a process 160 for cooling system and extracting crystal. Although this method of making has been shown using a selected sequence of processes, there can be many alternatives, modifications, and variations. For example, some of the processes may be expanded and/or combined. Other processes may be inserted to those noted. Depending upon the embodiment, the specific sequence of processes may be interchanged with others replaced. For example, the process 150 is modified to use spontaneous nucleation, or use conventional optical crystal growth procedures to introduce a cold finger to the melt surface. Further details of these processes are found throughout the present specification and more particularly below.

At the process 110, certain chemicals are measured and mixed. For example, high purity oxide powders and chemicals are measured and mixed in appropriate proportions. At the process 120, the mixture is transferred to crucible and furnace. For example, the mixture is loaded in a crucible and placed in a furnace. At the process 130, the mixture is melted. For example, the mixture is heated and caused to melt into a liquid.

At the process 140, furnace conditions are optimized for crystallization. For example, after a time, the melt temperature is brought near to its freezing point. At the process 150, a seed is introduced and the crystallization is started. For example, a seed crystal is introduced to initiate crystallization. In another example, the process 150 is modified to use a cold finger material to initiate crystallization. In yet another example, the process 150 is modified to use spontaneous nucleation to initiate crystallization. Additionally, the melt temperature and apparatus conditions are modified and monitored to encourage crystal growth. At the process 160, the system is cooled and the crystal is extracted. For example, when appropriate, the system is brought down to room temperature. The crystal is removed from the system and ready for tests or further processing.

As an example for the method 100, the synthesis of $Y_{(1-x)}La_xAl_3B_4O_{12}$, where $0 \leq x \leq 0.4$ is performed as follows:

At the process 110, yttrium oxide ($Y_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% are obtained. For example, these chemicals are acquired from commercial vendors such as Aesar and Stanford Materials. A mixture is formed including about 14 wt % $Y_2O_3$, about 30 wt % $La_2O_3$, about 19 wt % $Al_2O_3$, and about 37 wt % $B_2O_3$.

At the process 120, the mixture is loaded into a Pt-group metal crucible and placed in a high-temperature furnace with atmospheric environment control. For example, either ambient or an inert atmosphere is satisfactory. At the process 130, the mixture is heated in 12 hours from room temperature to another temperature ranging from 1450 to 1575 K. The resulting melt is allowed to soak at another temperature for about 1 to 3 days.

At the process 140, the liquid mixture is cooled at a rate of 20 K/hour to a temperature near its freezing point. For example, the temperature ranges from about 1475 to 1400 K. At the temperature, the mixture is held for about 8 hours. At the process 150, by spontaneous nucleation, or by using conventional optical crystal growth procedures to introduce a crystalline seed or cold finger to the melt surface, the product begins to form while cooling to a final temperature of 1300 K at a rate of about 1-5 K/day. Additionally, during the course of the growth, the melt temperature and apparatus conditions are monitored and optionally modified to encourage crystal growth, either by an operator and/or by the automated control system on the furnace.

At the process 160, the system is then cooled to room temperature at a cooling rate of about 50 K/hour. Colorless, transparent crystal of $Y_{(1-x)}La_xAl_3B_4O_{12}$, where $0 \leq x \leq 0.4$, is obtained and removed from the furnace.

In yet another example for the method 100, the synthesis of $Lu_{(1-x)}La_xAl_3B_4O_{12}$, where $0 \leq x \leq 0.4$, is performed as follows:

At the process 110, lutetium oxide ($Lu_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% are obtained. For example, these chemicals are acquired from commercial vendors such as Aesar and Stanford Materials. A mixture is formed including about 21 wt % $Lu_2O_3$, about 30 wt % $La_2O_3$, about 16 wt % $Al_2O_3$, and about 34 wt % $B_2O_3$.

At the process 120, the mixture is loaded into a crucible and placed in a high-temperature furnace with atmospheric environment control of nitrogen with a partial pressure of oxygen, which is larger than or equal to 3000 ppm. At the process 130, the mixture is heated in 12 hours from room temperature to another temperature ranging from 1450 to 1575 K. The resulting melt is allowed to soak at another temperature for about 1 to 3 days.

At the process 140, the liquid mixture is cooled at a rate of 20 K/hour to a temperature near its freezing point. For example, the temperature ranges from about 1475 to 1400 K. At the temperature, the mixture is held for about 8 hours. At the process 150, by spontaneous nucleation, or by using conventional optical crystal growth procedures to introduce a crystalline seed or cold finger to the melt surface, the product begins to form while cooling to a final temperature of 1275 K at a rate of about 1-5 K/day. Additionally, during the course of the growth, the melt temperature and apparatus conditions are monitored and optionally modified to encourage crystal growth, either by an operator and/or by the automated control system on the furnace.

At the process 160, the system is then cooled to room temperature at a cooling rate of about 50 K/hour. Colorless, transparent crystal of $Lu_{(1-x)}La_xAl_3B_4O_{12}$, where $0 \leq x \leq 0.4$, is obtained and removed from the furnace.

In yet another example for the method 100, the synthesis of $Sc_{(1-x)}La_xAl_3B_4O_{12}$, where $0 \leq x \leq 0.4$, is performed as follows:

At the process 110, scandium oxide ($Sc_2O_3$), having a purity of greater than 99.9%, lanthanum oxide ($La_2O_3$), having a purity of greater than 99.9%, aluminum oxide ($Al_2O_3$), having a purity greater than 99.9%, and boron oxide ($B_2O_3$), having a purity of greater than 99.9% are obtained. For example, these chemicals are acquired from commercial vendors such as Aesar and Stanford Materials. A mixture is formed including about 8 wt % $Sc_2O_3$, about 34 wt % $La_2O_3$, about 18 wt % $Al_2O_3$, and about 39 wt % $B_2O_3$.

At the process 120, the mixture is loaded into a crucible and placed in a high-temperature furnace with atmospheric environment control. For example, either ambient or a nitrogen atmosphere is satisfactory. At the process 130, the mixture is heated in 12 hours from room temperature to another temperature ranging from 1475 to 1600 K. The resulting melt is allowed to soak at temperature for about 1 to 3 days.

At the process 140, the liquid mixture is cooled at a rate of 20 K/hour to a temperature near its freezing point. For example, the temperature ranges from about 1500 to 1425 K. At the temperature, the mixture is held for about 8 hours. At the process 150, by spontaneous nucleation, or by using conventional optical crystal growth procedures to introduce a crystalline seed or cold finger to the melt surface, the product begins to form while cooling to a final temperature of 1300 K at a rate of about 1-5 K/day. Additionally, during the course of the growth, the melt temperature and apparatus conditions are monitored and optionally modified to encourage crystal growth, either by an operator and/or by the automated control system on the furnace.

At the process 160, the system is then cooled to room temperature at a cooling rate of about 50 K/hour. Colorless, transparent crystal of $Sc_{(1-x)}La_xAl_3B_4O_{12}$, where $0 \leq x \leq 0.4$, is obtained and removed from the furnace.

Figure 9:
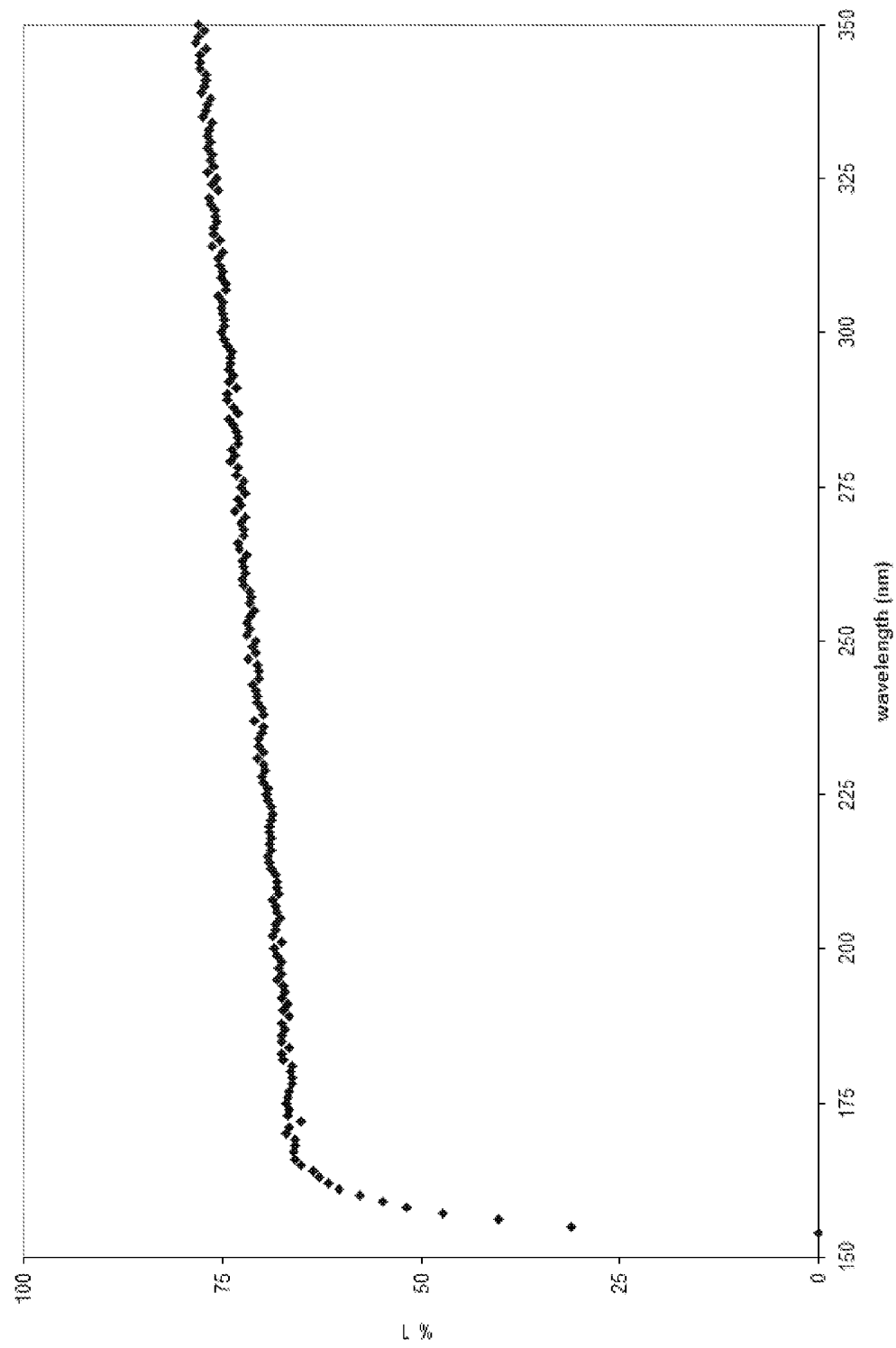
FIG. 9 is a simplified diagram showing transmission characteristics for an optical compound according to an embodiment of the present invention

FIG. 9 is a simplified diagram showing transmission characteristics for an optical compound according to an embodiment of the present invention. This diagram is merely an example, which should not unduly limit the scope of the claims. One of ordinary skill in the art would recognize many variations, alternatives, and modifications. The optical compound includes $Y_{(1-x)}La_xAl_3B_4O_{12}$, where $0 \leq x \leq 0.4$, made by the method 100 as discussed. The synthesis starts with yttrium oxide ($Y_2O_3$), lanthanum oxide ($La_2O_3$), aluminum oxide ($Al_2O_3$), and boron oxide ($B_2O_3$). As shown in FIG. 9, a curve 300 shows the transmission percentage as a function of wavelength; surface and bulk scattering were not eliminated from the data collection. The transmission percentage remains relevant from 350 nm to about 175 nm. In an embodiment, the transmission (defined as the ratio of the power of a light beam just before refracting out of a slab to the power of the light beam just after refracting into a slab) is at least 70% at one or more wavelengths between 190 and 350 nm. In other embodiments, the transmission is at least 80% at one or more wavelengths between 190 and 350 nm. According to this definition, Fresnel losses do not lower the value of the transmission.

As discussed herein, and further emphasized here, the method can be used to make various types of optical compounds. According to one embodiment of the present invention, a compound for non-linear optics for use at 350 nm and below is made by the method 100. The compound includes a material for non-linear optics comprising $YAl_3B_4O_{12}$. The compound is free from a molybdenum bearing impurity of at least 1000 parts per million. According to yet another embodiment of the present invention, a compound for non-linear optics for use at 350 nm and below is made by the method 100. The compound comprising a material for non-linear optics includes $Y_{(1-x)}M_xAl_3B_4O_{12}$. x is larger than or equal to zero and smaller than or equal to 0.4, and M is selected from a group consisting of Sc, La, and Lu. The compound is free from a molybdenum bearing impurity of at least 1000 parts per million.

According to yet another embodiment of the present invention, a compound for non-linear optics for use at 350 nm and below is made by the method 100. The compound comprising a material for non-linear optics includes $Lu_{(1-x)}M_xAl_3B_4O_{12}$. x is larger than or equal to zero and smaller than or equal to 0.4, and M is selected from a group consisting of Sc, Y, Yb, and La. The compound is free from a molybdenum bearing impurity of at least 1000 parts per million. According to yet another embodiment of the present invention, a compound for non-linear optics for use at 350 nm and below comprising a material for non-linear optics includes $Sc_{(1-x)}M_xAl_3B_4O_{12}$. x is larger than or equal to zero and smaller than or equal to 0.4, and M is selected from a group consisting of Y, La, and Lu. The compound is free from a molybdenum bearing impurity of at least 1000 parts per million.

According to yet another embodiment of the present invention, a compound for non-linear optics for use at 350 nm and below is made by the method 100. The compound comprising a material for non-linear optics includes $A_xM_{(1-x)}Al_3B_4O_{12}$. x is larger than or equal to zero and smaller than or equal to 0.4, A is selected from a group consisting of Sc, Y, La, and Lu, and M is selected from a group consisting of Sc, Y, La, and Lu. The compound is free from a molybdenum bearing impurity of at least 1000 parts per million. In one embodiment, M includes at least one selected from a group consisting of La, Lu, Sc, and Y. In another embodiment, A includes at least one selected from a group consisting of Sc, Y, La, and Lu.

As discussed herein, according to certain embodiments, each of various types of optical compounds made by the method 100 is free from a molybdenum bearing impurity of at least 1000 parts per million. For example, the compound is free from a molybdenum bearing impurity of at least 500 parts per million. In another example, the compound is free from a molybdenum bearing impurity of at least 100 parts per million. In yet another example, the compound is free from a molybdenum bearing impurity of at least 10 parts per million. In yet another example, the compound is free from a molybdenum bearing impurity of at least 1 part per million. In yet another example, the compound is substantially free from a molybdenum bearing impurity. According to some embodiments of the present invention, each of various types of optical compounds made by the method 100 each is free from any impurity of at least 1000 parts per million that can prevent the compound from being used for non-linear optics at 350 nm and below. For example, the compound is free from any such impurity of at least 500 parts per million. In another example, the compound is free from any such impurity of at least 100 parts per million. In yet another example, the compound is free from any such impurity of at least 10 parts per million. In yet another example, the compound is free from any such impurity of at least 1 part per million. In yet another example, the compound is substantially free from any such impurity.

As discussed herein, according to certain embodiments, each of various types of optical compounds made by the method 100 has a volume greater than about 0.001 mm$^3$. For example, the compound has a volume greater than about 0.01 mm$^3$. In another example, the compound has a volume greater than about 0.1 mm$^3$. In yet another example, the compound has a volume greater than about 1 mm$^3$.

According to some embodiments, various types of optical compounds made by the method 100 can be used for non-linear optics at 350 nm and below. For example, the use is associated with a wavelength ranging from about 350 nanometers to 160 nm. In another example, the use is associated with a wavelength ranging from about 350 nm to 170 nm. In yet another example, the use is associated with a device that generates optical radiation below 350 nm. In yet another example, the device comprises an NLO system, the compound associated with a laser system, and/or the compound associated with a light source.

According to certain embodiments, the method 100 can be used to make a compound for non-linear optics for use at 350 nm and below. For example, the compound is associated with the trigonal crystal class for use below 350 nm, and/or the space group R32 for use below 350 nm.

According to yet another embodiment of the present invention, a method for making a compound for non-linear optics for use at 350 nm and below includes providing a plurality of materials. The plurality of materials includes a lanthanum bearing compound, and the lanthanum bearing compound is capable of being decomposed into at least lanthanum oxide upon heating. Additionally, the method includes mixing the plurality of materials to form a mixture based on at least information associated with a predetermined proportion, starting a crystallization process in the mixture to form a crystal, and removing the crystal from the mixture, the crystal including lanthanum. For example, the plurality of materials comprises lanthanum oxide. In another example, the plurality of material further comprises boron oxide. In yet another example, the method further includes placing the mixture into a furnace. In yet another example, the method further includes heating the mixture to a first predetermined temperature, and cooling the mixture to a second predetermined temperature. In yet another example, the starting a crystallization process comprises inserting a crystalline seed to a melt surface. In yet another example, the crystal includes $A_xM_{(1-x)}Al_3B_4O_{12}$. x is larger than or equal to zero and smaller than or equal to 0.4, A is selected from a group consisting of Sc, Y, La, and Lu, and M is selected from a group consisting of Sc, Y, La, and Lu. In yet another example, the method is implemented according to the method 100.

According to yet another embodiment of the present invention, a method for making a compound for non-linear optics for use at 350 nm and below includes providing a plurality of materials. The plurality of materials includes an yttrium bearing compound, and the yttrium bearing compound is capable of being decomposed into at least yttrium oxide upon heating.

Additionally, the method includes mixing the plurality of materials to form a mixture based on at least information associated with a predetermined proportion, starting a crystallization process in the mixture to form a crystal, and removing the crystal from the mixture, the crystal including yttrium. For example, the plurality of materials includes yttrium oxide. In another example, the plurality of material further includes boron oxide. In yet another example, the method further includes placing the mixture into a furnace. In yet another example, the method further includes heating the mixture to a first predetermined temperature, and cooling the mixture to a second predetermined temperature. In yet another example, the starting a crystallization process comprises inserting a crystalline seed to a melt surface. In yet another example, the crystal includes $A_xM_{(1-x)}Al_3B_4O_{12}$. x is larger than or equal to zero and smaller than or equal to 0.4, A is selected from a group consisting of Sc, Y, La, and Lu, and M is selected from a group consisting of Sc, Y, La, and Lu. In yet another example, the method is implemented according to the method 100.

The materials described herein may be utilized as key components in the reliable generation of UV CW laser radiation, and as such, the embodiments of laser apparatus disclosed henceforth are specifically designed to take advantage of the intrinsic optical properties of these materials. To summarize, the nature of the huntite-type aluminum double borate materials described herein, the compositions of the previous more-detailed descriptions may be encapsulated by the general formula $MAl_3B_4O_{12}$ where M is comprised of one or a plural combination of the elements of the group {Sc, La, Y, Lu}, as described more fully throughout the present specification and more particularly below. Thus, a huntite-type aluminum double borate as described herein is characterized by a crystal with an isostructural form to that of the mineral huntite and arranged in the rhombohedral symmetry space group R32 that comprises a borate compound with two crystallographically distinct lattice sites, one of which is occupied by Al and the other is generally occupied by one or more rare earth elements of the group {Sc, La, Y, Lu}.

Figure 5:
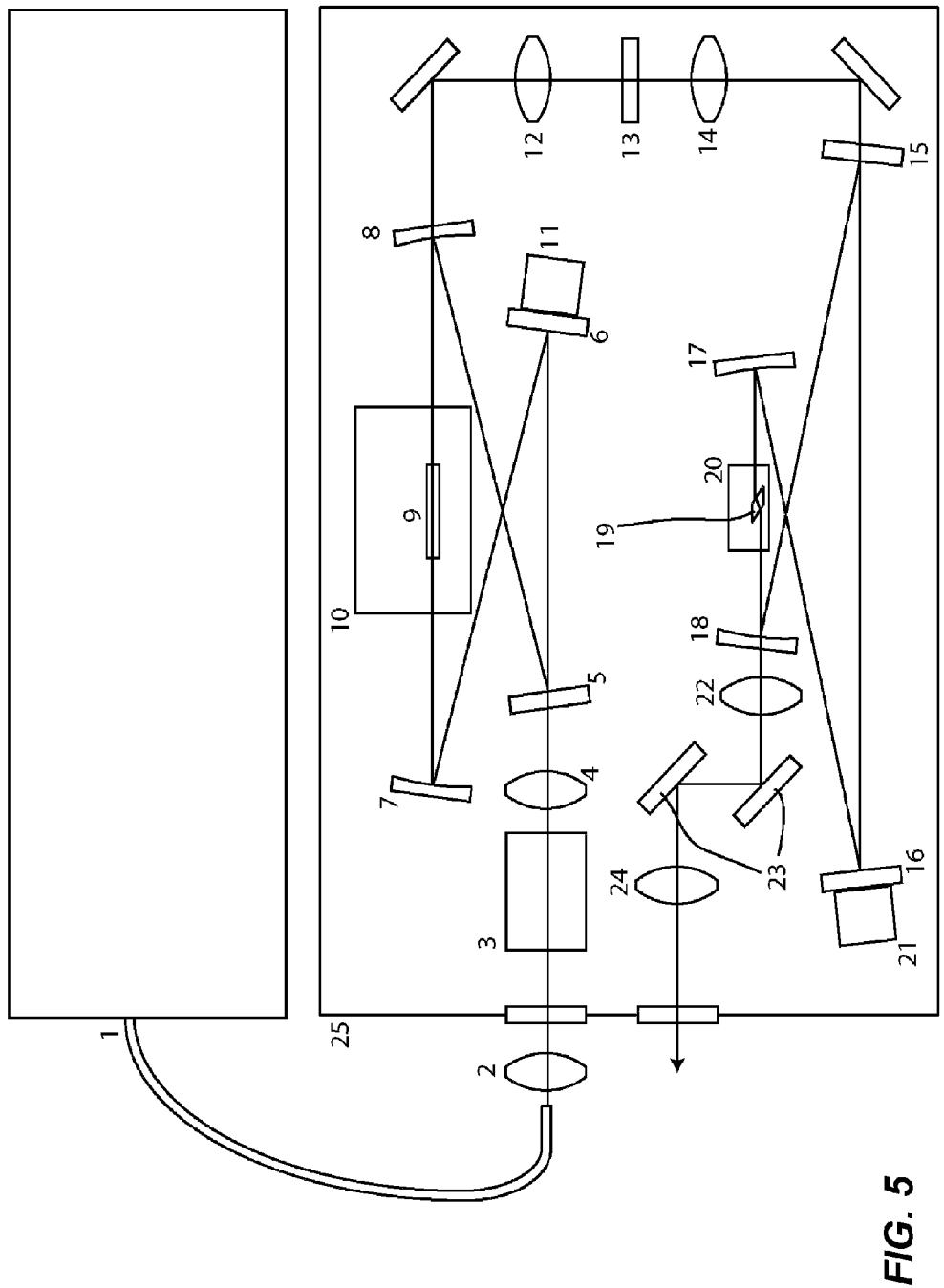
FIG. 5 represents an ultraviolet laser design for fourth harmonic generation according to an embodiment of the present invention.

FIG. 5 illustrates an entire UV laser apparatus that uses the materials described herein as a frequency converter to produce CW laser radiation from 190 to 350 nm in an embodiment of the present invention. The laser illustrated in FIG. 5 is not drawn to scale. The illustrated apparatus is a fourth harmonic generation system containing a NIR fiber laser source of frequency ω and two sequential SHG stages, each of which is a bow-tie shaped ring cavity that is singly resonant at its input wavelength. The fiber laser 1 has a CW output power of 10 W or greater, and is of sufficiently narrow linewidth to allow the FF light to resonate sufficiently in the first SHG stage and to allow the light generated in the first stage to resonate sufficiently in the second SHG stage. A lens system (one or more lenses in series) 2 near the end of the fiber brings the FF light into sufficient collimation. An optical isolator 3, which may or may not be necessary to eliminate back reflection into the fiber laser, follows lens system 2. A focusing lens system 4 focuses the FF beam down to a $1/e^2$ contour waist radius of $w^{(1)}_{in}$ to couple into the first cavity.

The NLO device 9 of the first stage is a commercial crystal of NCPM LBO that is used in a Type I configuration. The faces of the LBO may be cut so that the FF resonant light is p-polarized and enters and exits near Brewster's angle, so as to make reflection losses insignificant, or the faces of the LBO may be cut normal to the FF beam path (as is shown in FIG. 5), with the input face being AR coated for the FF and the output face being AR coated for both the FF and the SH. The normal cut option is preferred if the AR coatings are able to withstand the high light intensities without damage or significant degradation, and if the astigmatism caused by reflection from the curved mirrors is sufficiently low. The LBO crystal is heated, in a small insulated oven 10, to its NCPM temperature, and its temperature is controlled and stabilized. The cavity length is stabilized by the Pound-Drever-Hall (P-D-H) locking scheme if the crystal is not Brewster cut, or the Hänsch-Couillaud (H-C) locking scheme if the crystal is Brewster cut.

Mirrors 5, 6, 7, and 8, form the bow-tie ring cavity and have radii of curvature $R_5$, $R_6$, $R_7$, and $R_8$, respectively. $R_5$ and $R_6$ are large or infinite, while $R_7$ and $R_8$ are smaller, focusing the FF mode to have sagittal and tangential waist radii of $w^{(1)}_{s1}$ and $w^{(1)}_{t1}$ within the LBO crystal. The mirror 5 is an input coupler and is partially reflective (PR) at the FF. An alternative configuration uses mirror 7 as the input coupler. Either mirror 5 or mirror 6 is attached to a piezoelectric transducer (PZT) 11 or voice coil motor (VCM) to allow the cavity length, and, indirectly, the intracavity power enhancement, to be actively stabilized. Stabilization related components other than the PZT/VCM are not shown, but may be used as known in the art. The second waist of the FF mode lies between mirrors 5 and 6 and has radii $w^{(1)}_{s2}$ and $w^{(1)}_{t2}$. If coupling in through mirror 5, the input waist radius, $w^{(1)}_{in}$ is set between $w^{(1)}_{s2}$ and $w^{(1)}_{t2}$ to achieve the best coupling efficiency. Mirror 8 is the output coupler and, preferably, is AR-coated for the SH light. Light at frequency 2ω exits the first stage cavity at mirror 8 and is focused into the second cavity by lens system 12. An alternative configuration (shown) uses lens system 12 to sufficiently collimate the light in order for its polarization to be rotated 90° by a λ/2 wave plate 13 and uses an additional lens system 14 to focus light into the second cavity.

The second cavity resonates the 2ω light, set up similarly to the first with mirrors 15, 16, 17, and 18 having radii $R_{13}$, $R_{14}$, $R_{15}$, and $R_{16}$. The crystal waist radii are $w^{(2)}_{s1}$ and $w^{(2)}_{t1}$ and the air waist radii are $w^{(2)}_{s2}$ and $w^{(2)}_{t2}$. The NLO device 19 is a Brewster-cut single crystal of $(Y,La)Al_3(BO_3)_4$ where the input/output faces are about 61° from the angle of incidence. The NLO device is operated in a Type I configuration. The NLO device is mounted on a thermal controller 20 that is used to fine tune the NLO device optical indices so that the phase-matching condition is satisfied. The cavity is locked by the H-C scheme, with mirror 16 being mounted on a PZT 21 or VCM. The generated 4ω light that escapes the crystal passes efficiently through the output coupler 18, which is AR coated for the 4ω light. The light is then approximately collimated by lens system 22.

The 4ω light is then optionally separated from residual 2ω light by a prism or by one or two harmonic separators 23. The light then may go through an additional beam shaping lens system 24 to circularize the beam profile, as walk-off in the second SHG process will have generated an elongated beam. Sealed or gas-purged enclosures, containing AR-coated optical windows through that the beam enters and exits and surrounding the second stage or surrounding both stages, either separately or together 25, may be necessary to control the environment and prevent long term damage by particles or gasses interacting with the intensely illuminated surfaces inside the cavities.

The embodiment illustrated in FIG. 5 has been designed as a 1 W, 266 nm laser. The source is presumed to be a 1064 nm fiber laser producing 20 W and having a spectral linewidth less than 0.4 MHz, which is sufficiently narrow so as to preserve the enhancement performance of the cavities involved. The first cavity has $R_5=R_6=\infty$, $R_7=R_8=150$ mm, with a normal cut 20 mm LBO crystal and a bowtie angle of about 15°. The NCPM temperature for the LBO is about 149° C. The LBO faces are cut for normal incidence and are AR coated. The beam path between mirrors 5 and 6 is 131 mm long and is parallel to the beam path between mirrors 7 and 8, which is 164 mm long (including the 20 mm of LBO). The waist radii, predicted by Gaussian resonator theory, are $w^{(1)}_{s1}=0.060$ mm, $w^{(1)}_{t1}=0.065$ mm, $w^{(1)}_{s2}=0.42$ mm, and $w^{(1)}_{t2}=0.37$ mm. Light is coupled in with a waist radius of $w^{(1)}_{in}=0.39$ mm that achieves a geometric mode coupling greater than 0.996 with Gaussian beam profiles. The power reflectivity of the input coupler 5 at 1064 nm is 0.91. The total round trip passive power loss in the cavity, including the 0.09 loss at 5, is assumed to be 0.107.

With 18 W of the input light coupled into the cavity, intracavity power enhancement is 17 times, and about 11.7 W of 532 nm light is generated. 10.5 W of this light is coupled into the mode of the second cavity. The second cavity has $R_{13}=R_{14}=\infty$, $R_{15}=R_{16}=100$ mm, with a bowtie angle of 12.5°. The crystal 19 thickness measured as the distance between the Brewster faces is about 3 mm. The orientation of the beam in the crystal, relative to the axes on that the d tensor is constructed, given by theta of about 66 degrees, phi of about 0 degrees, and an effective d of about $0.6\times10^{-12}$ m/V. The distance along the beam path from 17 to the input surface of 19, and from the output surface of 19 to 18 is 60 mm. The beam path length from 18 to 15 to 16 to 17 is about 553 mm. The power reflectivity of input coupler 15 is about 0.95, and the total round trip passive cavity power loss, including the loss of 0.05 at 15, is assumed to be 0.07. The waist radii, predicted by Gaussian resonator theory, are $w^{(2)}_{s1}=0.020$ mm, $w^{(2)}_{t1}=0.031$ mm, $w^{(2)}_{s2}=0.92$ mm, and $w^{(2)}_{t2}=0.80$ mm. The determined operating cavity power enhancement is about 36 times, the operating cavity linewidth is about 4.9 MHz (at 532 nm), and the power at 266 nm after subtracting the loss incurred by exiting the crystal is about 1.2 W. Such a laser can produce at least 1.0 W of polarized 266 nm light that lies in the fundamental Gaussian mode.

Figure 6:
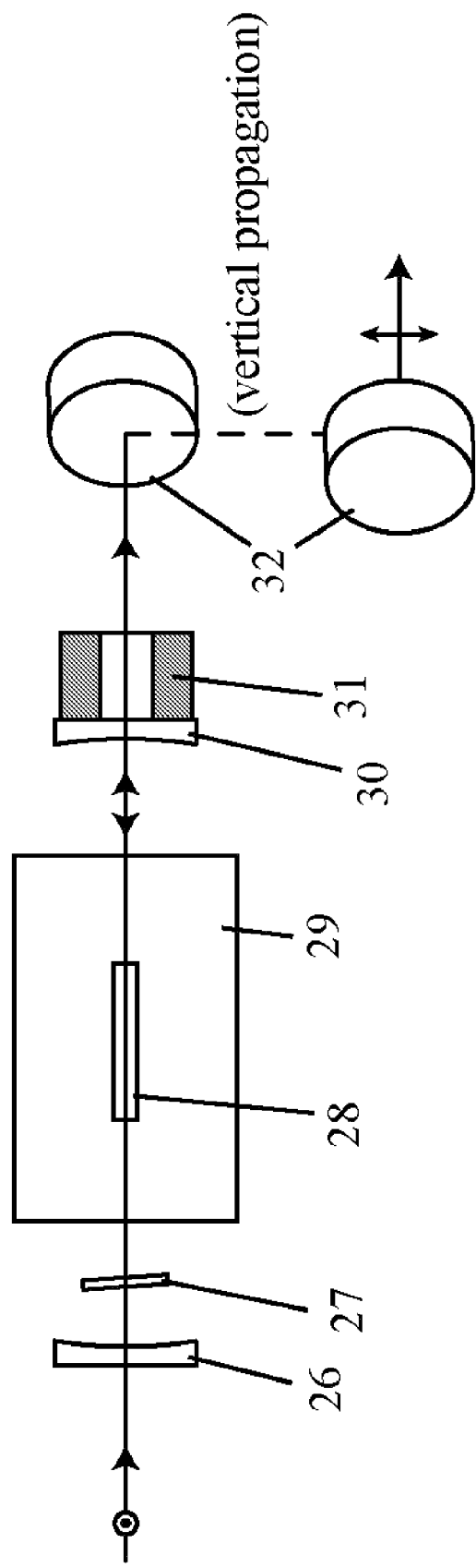
FIG. 6 represents an ultraviolet laser design for fourth harmonic generation with the first stage as a linear cavity in which the backward traveling SH light is double passed according to an embodiment of the present invention.

Another embodiment of the present invention, shares some common elements with the embodiment illustrated in FIG. 5, except that the first stage is a linear cavity in which the backward traveling SH light is double passed (see FIG. 2c). This frequency doubling stage is shown in FIG. 6. FF light enters the cavity through the input coupler (concave mirror) 26, and then the light passes through a variable phase compensator 27. The compensator may be implemented as an AR-coated slab of birefringent material (e.g., sapphire) that is rotated around the vertical axis (the axis normal to the plane of the diagram) and has its optical axis lying in the plane of the diagram but at a significant angle (such as 30°-60°) away from the beam direction and the normal of the slab faces so that the FF light passes as an ordinary ray. Other birefringent materials included within the scope of the present invention include crystalline quartz or the like. One of ordinary skill in the art would recognize many variations, modifications, and alternatives.

The SH light passes as an extraordinary ray, and the phase difference $2\Phi^{FF}-\Phi^{SH}$ can be adjusted over $2\pi$ by tilting of the birefringent material by a few degrees (e.g., less than 10°) in the plane of the figure with respect to the axis of the cavity. The phase compensator is necessary to adjust the phase of the SH light generated in the backward direction so that it matches the phase of the SH light generated in the forward direction. In an alternate design, the phase compensator 27 is incorporated into the coating structure of either the input coupler 26 or the input face of the LBO 28.

The light then goes through a normal-cut AR-coated piece of LBO 28, setting inside an oven 29 that heats it to its NCPM temperature. The output coupler 30 is attached to a PZT 31 or VCM having a hole that allows light to escape. The PZT/VCM could instead be attached to the input coupler. The cavity length is locked by the P-C-H scheme. The input coupler is partially reflective for FF light and is reasonably highly reflective for SH light. The output coupler is either partially or highly reflective for FF light and anti-reflective for SH light. It may be necessary to filter the output FF light out of the beam by using a prism or using harmonic separators 32. The remaining apparatus components are essentially the same as shown in FIG. 4. The advantages of the linear cavity over the bowtie cavity are ease of alignment, lack of significant astigmatism, and smaller physical footprint.

In an alternative embodiment, a 532 nm source laser is used that is a DPSS laser with an intracavity NLO device that frequency doubles 1064 nm light within the laser cavity. A 10 W version of this source laser with a linewidth less than 0.3 MHz is used so as to avoid reduced coupling into the SHG cavity. This embodiment includes a laser of this type, together with a frequency doubling apparatus consisting of components 13 through 25 of FIG. 5. An optical isolator may be necessary before component 13. With 8.7 W coupled into the cavity, and using a power reflectivity of about 0.97 for mirror 15, the power at 266 nm after subtracting the loss incurred by exiting the crystal is about 1.05 W. Such a laser is determined to produce at least 0.85 W of polarized 266 nm light that lies in the fundamental Gaussian mode.

Figure 7:
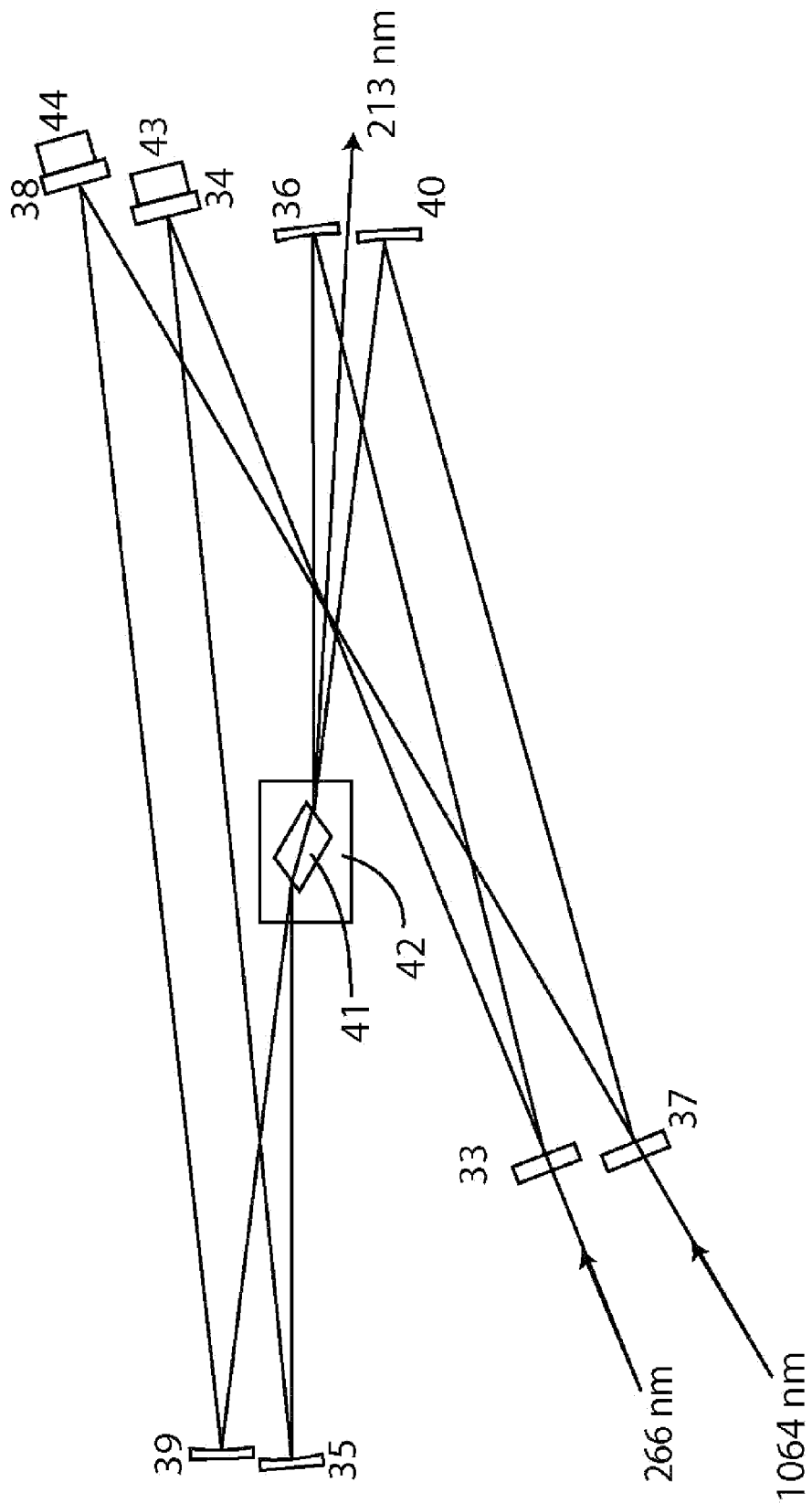
FIG. 7 illustrates an ultraviolet laser design for fourth harmonic generation including a two-cavity SFG stage according to an embodiment of the present invention.

In another alternative embodiment, similar elements are shared with previous embodiments and a two-cavity SFG stage is added (see FIG. 7) that combines 266 nm light and 1064 nm light to create 213 nm light. Both the 266 nm light and the 1064 nm light are resonated in ring cavities locked by the H-C scheme. The SFG stage uses a NLO device 41 made from the materials described herein. The NLO device is critically phase-matched and the input light modes are ordinary beams, while the output beam is an extraordinary beam. Fine tuning of the phase-matching condition is performed by temperature control via a heater or cooler 42. The NLO device is oriented so that the 266 nm mode enters and exits the crystal nominally at Brewster's angle while the 1064 nm mode enters and exits at a slightly different angle. The angles are arranged so that the two input modes are nominally collinear inside the NLO device; this is possible because the two input modes, which refract according to Snell's law, see different optical indices within the crystal due to dispersion.

The 213 nm output light beam leaves the NLO device at an angle between the exit angle of the 266 nm mode and the exit angle of the 1064 nm mode.

Figure 12:
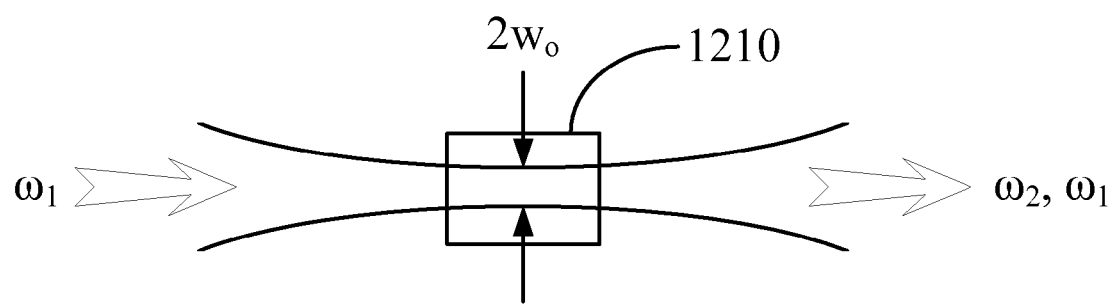
FIG. 12 is a simplified diagram illustrating a beam waist according to an embodiment of the present invention.

FIG. 12 is a simplified diagram illustrating a beam waist according to an embodiment of the present invention. As illustrated in FIG. 12, light at a first frequency, $\omega_1$ is incident on a nonlinear optical device 1210. The radius of curvature of the mode is initially increasing as a function of distance, producing a planar wavefront at the beam waist illustrated by the distance $2w_0$. At the beam waist, the beam intensity is given by the illustrated formula, $I(\omega_1)=P/2\pi(w_0)^2$. Frequency conversion inside the nonlinear optical device (e.g., a nonlinear crystal) results in the production of light at both the first frequency $\omega_1$ and a second frequency $\omega_2$. Thus, embodiments of the present invention provide for a local maximum optical intensity inside or on a surface of the nonlinear optical material is greater than 5 MW/cm$^2$ during operation. In FIG. 12, the maximum intensity is located at the beam waist inside the NLO device 1210. In other embodiments, the local maximum optical intensity is greater than 10 MW/cm$^2$, 15 MW/cm$^2$, 20 MW/cm$^2$, 25 MW/cm$^2$, or 50 MW/cm$^2$.

The apparatus provided by embodiments of the present invention can be used in a variety of optical systems for different applications. As an example, optical systems for defect inspection can incorporate light sources as described herein. Such optical systems for defect inspection can be adapted for bright field illumination, dark field illumination, or photomask, reticle, wafer, or glass inspection. The wavelength of the light provided by the light source can be provided as appropriate to the particular application.

In another application, the apparatus provided by embodiments of the present invention can be incorporated into an optical instrument for identification, qualitative, and/or quantitative analyses of physical phenomena that includes the techniques of interferometry, scatterometry, and spectroscopy. These techniques are listed merely by way of example and other techniques are included within the scope of embodiments of the present invention. Moreover, the apparatus provided by embodiments of the present invention can be incorporated into an optical system for identification, qualitative, and/or quantitative analyses of biological samples. Such optical systems for use with biological samples may include the use of capillary electrophoresis, cytology, DNA manipulation, and flow cytometry techniques. As with other applications, the wavelength, intensity, polarization, and other optical properties of the light source will be tailored to the particular application. One of ordinary skill in the art would recognize many variations, modifications, and alternatives.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for producing coherent, continuous wave, ultraviolet light, the apparatus comprising:
one or more source lasers in the visible or near-infrared frequency range; and
one or more frequency conversion stages operable to perform a frequency conversion process, each of the one or more frequency conversion stages including one or more reflectors, an optical resonator, one or more waveguide components, or one or more fiber optic components, wherein at least one of the one or more frequency conversion stages includes a nonlinear critically phase-matched frequency conversion device that includes a huntite-type aluminum double borate nonlinear optical material configured to produce light having a wavelength between 190 and 350 nm, the huntite-type aluminum double borate material having a composition given by $RAl_3B_4O_{12}$, where R comprises one or a plurality of elements Sc, La, Y, or Lu and the device is oriented with at least an entrance or exit surface at Brewster's angle to one or more frequencies involved in the frequency conversion process.

2. The apparatus of claim 1 wherein the huntite-type aluminum double borate material is characterized by a transmission of at least 70% per mm at one or more wavelengths between 190 and 350 nm.

3. The apparatus of claim 1 wherein the light comprises output light of the apparatus.

4. The apparatus of claim 1 wherein the one or more frequency conversion stages comprises a stage of second harmonic generation and the light comprises output light of the apparatus.

5. The apparatus of claim 1 wherein the one or more frequency conversion stages comprises a first stage of second harmonic generation and a second stage of frequency conversion, wherein the second stage of frequency conversion includes the huntite-type aluminum double borate nonlinear optical material.

6. The apparatus of claim 5 wherein the frequency conversion comprises sum frequency conversion.

7. The apparatus of claim 5 wherein the frequency conversion comprises second harmonic generation.

8. The apparatus of claim 1 wherein the one or more frequency conversion stages comprises a first stage of second harmonic generation, a second stage of second harmonic generation, and a third stage of frequency conversion, wherein the third stage of frequency conversion includes the huntite-type aluminum double borate nonlinear optical material.

9. The apparatus of claim 1 wherein:
the one or more source lasers comprises a single source laser characterized by a nominal angular frequency of $\omega$; and
output light of the apparatus is characterized by one or more components at $2\omega$, $3\omega$, $4\omega$, $5\omega$, $6\omega$, $7\omega$, or $8\omega$.

10. The apparatus of claim 1 wherein the huntite-type aluminum double borate nonlinear optical material includes an anti-reflection coating on one or more surfaces.

11. The apparatus of claim 1 wherein the one or more source lasers includes a fiber laser.

12. The apparatus of claim 1 wherein the one or more source lasers includes a diode pumped solid state laser.

* * * * *